(12) United States Patent
Komine et al.

(10) Patent No.: US 12,496,015 B2
(45) Date of Patent: Dec. 16, 2025

(54) DISEASE-CONDITION ASSESSMENT DEVICE, DISEASE-CONDITION ASSESSMENT METHOD, PROGRAM FOR DISEASE-CONDITION ASSESSMENT DEVICE, AND DISEASE-CONDITION ASSESSMENT SYSTEM

(71) Applicants: National Institute of Advanced Industrial Science and Technology, Tokyo (JP); University of Tsukuba, Tsukuba (JP); YAZAKI CORPORATION, Tokyo (JP); SUBARU CORPORATION, Tokyo (JP); Mitsubishi Electric Corporation, Tokyo (JP)

(72) Inventors: Hidehiko Komine, Ibaraki (JP); Satoshi Kitazaki, Ibaraki (JP); Motoyuki Akamatsu, Ibaraki (JP); Kei Ishii, Ibaraki (JP); Hideo Tsurushima, Ibaraki (JP); Motoki Shino, Chiba (JP)

(73) Assignees: NATIONAL INSTITUTE OF ADVANCED INDUSTRIAL SCIENCE AND TECHNOLOGY, Tokyo (JP); YAZAKI CORPORATION, Tokyo (JP); SUBARU CORPORATION, Tokyo (JP)

( * ) Notice: Subject to any disclaimer, the term of this patent is extended or adjusted under 35 U.S.C. 154(b) by 1046 days.

(21) Appl. No.: 17/610,065

(22) PCT Filed: Feb. 28, 2020

(86) PCT No.: PCT/JP2020/008210
§ 371 (c)(1),
(2) Date: Nov. 9, 2021

(87) PCT Pub. No.: WO2020/225969
PCT Pub. Date: Nov. 12, 2020

(65) Prior Publication Data
US 2022/0218287 A1 Jul. 14, 2022

(30) Foreign Application Priority Data
May 9, 2019 (JP) .................................. 2019-089024

(51) Int. Cl.
*A61B 5/103* (2006.01)
*A61B 5/00* (2006.01)
(Continued)

(52) U.S. Cl.
CPC .......... *A61B 5/6893* (2013.01); *A61B 5/1036* (2013.01); *A61B 5/1121* (2013.01);
(Continued)

(58) Field of Classification Search
None
See application file for complete search history.

(56) References Cited

U.S. PATENT DOCUMENTS

| | | | |
|---|---|---|---|
| 2013/0009761 A1* | 1/2013 | Horseman ............ | A61B 5/6893 340/576 |
| 2016/0089059 A1* | 3/2016 | Hu ........................ | A61B 5/7207 600/595 |
| 2017/0161576 A1* | 6/2017 | Banno ..................... | B60R 11/04 |

FOREIGN PATENT DOCUMENTS

| | | |
|---|---|---|
| JP | 2002-008159 A | 1/2002 |
| JP | 2012254745 A | * 12/2012 |

(Continued)

OTHER PUBLICATIONS

English machine translation of JP 2002008159 A. Retrieved Feb. 22, 2025. (Year: 2025).*

(Continued)

*Primary Examiner* — Meredith Weare
(74) *Attorney, Agent, or Firm* — LUCAS & MERCANTI, LLP

(57) ABSTRACT

Provided are a disease-condition assessment device for assessing a disease condition of a subject, a disease-condition assessment method, a program for disease-condition assessment device, and a disease-condition assessment system. The disease condition assessment device acquires a data of a seat pressure distribution on a seating surface where a subject operating a vehicle is seated, calculates a center position depending on the seat pressure distribution, calculates a degree of laterality in the seat pressure distri- (Continued)

bution based on the center position, and assesses a disease condition of the subject depending on the degree of laterality.

24 Claims, 23 Drawing Sheets

(51) Int. Cl.
*A61B 5/11* (2006.01)
*B60N 2/00* (2006.01)
*G16H 50/20* (2018.01)

(52) U.S. Cl.
CPC .......... *A61B 5/4842* (2013.01); *A61B 5/7267* (2013.01); *B60N 2/0022* (2023.08); *G16H 50/20* (2018.01); *A61B 5/681* (2013.01)

(56) References Cited

FOREIGN PATENT DOCUMENTS

| JP | 2015-141536 A | 8/2015 |
| JP | 2015-168339 A | 9/2015 |
| JP | 2018-169656 A | 11/2018 |

OTHER PUBLICATIONS

English machine translation of JP 2012254745 A. Retrieved Jul. 12, 2025. 8 pages. (Year: 2025).*

PCT, International Search Report for the corresponding patent application No. PCT/JP2020/008210, dated Apr. 21, 2020, with English translation.

* cited by examiner

DISEASE-CONDITION ASSESSMENT DEVICE, DISEASE-CONDITION ASSESSMENT METHOD, PROGRAM FOR DISEASE-CONDITION ASSESSMENT DEVICE, AND DISEASE-CONDITION ASSESSMENT SYSTEM

CROSS REFERENCE TO RELATED APPLICATION

This Application is a 371 of PCT/JP2020/008210 filed on Feb. 28, 2020 which, in turn, claimed the priority of Japanese Patent Application No. 2019-089024 filed on May 9, 2019, and both applications are incorporated herein by reference.

TECHNICAL FIELD

The present invention relates to techniques for a disease-condition assessment device for assessing a disease condition of a subject, a disease-condition assessment method, a program for the disease-condition assessment device, and a disease-condition assessment system.

BACKGROUND ART

Various assessment systems have been developed to detect the condition of a driver driving a vehicle. For example, Patent Literature 1 discloses a safe driving support system in which a device that measures the driving ability and health information of a vehicle driver and transmits the driving ability check results and the health information check results to a server is installed at a plurality of points along the vehicle travel route, and the server evaluates the driving risk level of the vehicle driver based on the driving ability check results, the health information check results, and the evaluation criteria and diagnoses an increase in the driving risk level of the vehicle driver by comparing the driving ability check results and the health information check results over time.

CITATION LIST

Patent Literature

Patent Literature 1: JP 2015-141536 A

SUMMARY OF INVENTION

Problem to be Solved by the Invention

However, in the prior art like Patent Literature 1, in order to measure health condition, special equipment such as breath gas component measuring devices were required, and the driving risk level is simply assessed in combination with exercise capacity regardless of a particular disease. Therefore, it was difficult to assess the condition of a certain disease in a simple way.

Hence, it is an object of the present invention to provide, for example, a disease-condition assessment device, etc., for assessing the condition of a certain disease.

Means for Solving the Problem

To solve the above problem, an embodiment of the invention includes: seat pressure distribution acquiring means for acquiring a data of a seat pressure distribution on a seating surface where a subject operating a vehicle is seated; center position calculating means for calculating a center position depending on the seat pressure distribution; degree-of-laterality calculating means for calculating a degree of laterality in the seat pressure distribution based on the center position; and disease-condition assessment means for assessing a disease condition of the subject depending on the degree of laterality.

The invention according to another embodiment of the invention includes a step in which seat pressure distribution acquiring means acquires a data of a seat pressure distribution on a seating surface where a subject operating a vehicle is seated; a step in which center position calculating means calculates a center position depending on the seat pressure distribution; a step in which degree-of-laterality calculating means calculates a degree of laterality in the seat pressure distribution based on the center position; and a step in which disease-condition assessment means assesses a disease condition of the subject depending on the degree of laterality.

The invention according to a further embodiment causes a computer to function as: seat pressure distribution acquiring means for acquiring a data of a seat pressure distribution on a seating surface where a subject operating a vehicle is seated; center position calculating means for calculating a center position depending on the seat pressure distribution; degree-of-laterality calculating means for calculating a degree of laterality in the seat pressure distribution based on the center position; and disease-condition assessment means for assessing a disease condition of the subject depending on the degree of laterality.

The invention according to yet another embodiment is a disease-condition assessment system including a terminal device that collects a data of a seat pressure distribution on a seating surface where a subject operating a vehicle is seated and a disease-condition assessment device for assessing a disease condition of the subject based on the data of the seat pressure distribution, the disease-condition assessment device includes: seat pressure distribution acquiring means for acquiring the data of the seat pressure distribution from the terminal device; center position calculating means for calculating a center position depending on the seat pressure distribution; degree-of-laterality calculating means for calculating a degree of laterality in the seat pressure distribution based on the center position; and disease-condition assessment means for assessing a disease condition of the subject depending on the degree of laterality.

Effect of the Invention

According to the present invention, by acquiring a data of a seat pressure distribution on a seating surface where a subject operating a vehicle is seated, calculating a center position depending on the seat pressure distribution, calculating a degree of laterality in the seat pressure distribution based on the center position, and assessing a disease condition of the subject depending on the degree of laterality, it is possible to assess the condition of a predetermined disease from the data that is easy to measure, such as data of the seat pressure distribution on the seating surface where a subject operating a vehicle, without special equipment.

DESCRIPTION OF EMBODIMENTS

The following describes an embodiment of the present invention with reference to the drawings. In the embodiment described below, the present invention is applied to a disease-condition assessment system.

[1. Configuration and Functional Overview of Disease-Condition Assessment System]

Figure 1:
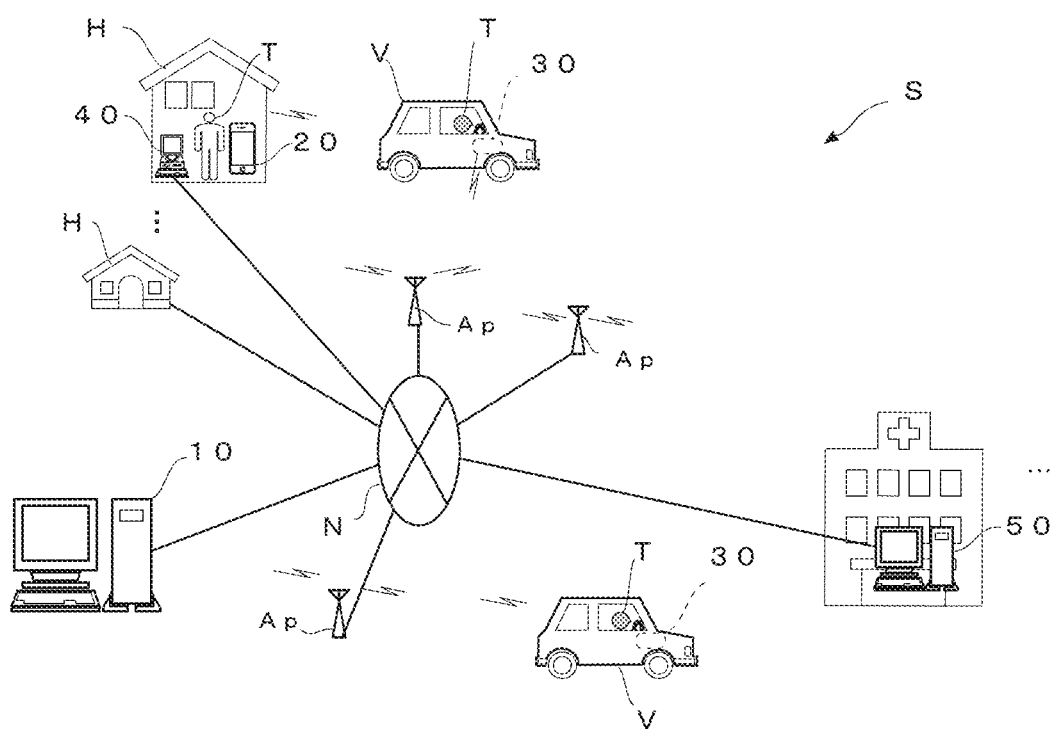
FIG. 1 is a schematic diagram showing an example of overview configuration of a disease-condition assessment system according to an embodiment.
Figure 2:
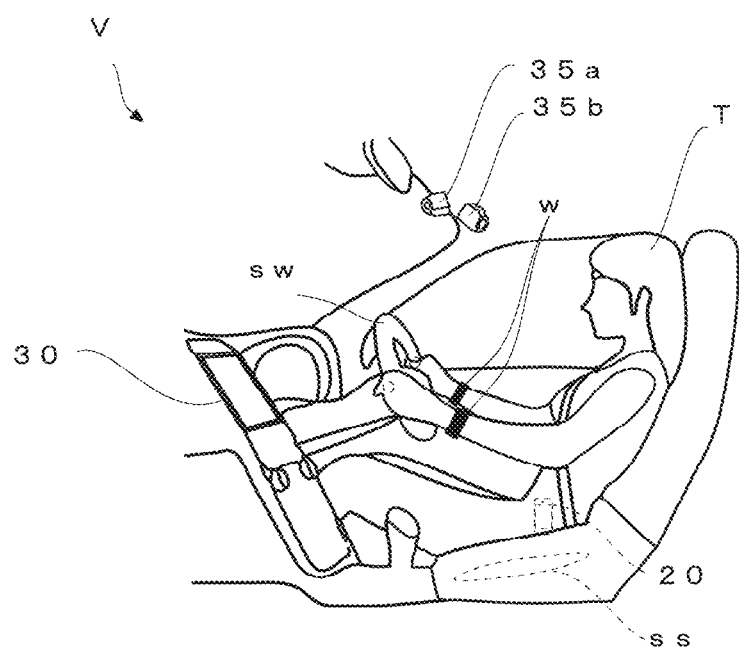
FIG. 2 is a schematic diagram showing an example of appearance of a subject steering a vehicle.

First, a configuration of a disease-condition assessment system S according to an embodiment of the present invention is described using FIG. 1 and FIG. 2. FIG. 1 is a schematic diagram showing an example of overview configuration of a disease-condition assessment system S according to an embodiment. FIG. 2 is a schematic diagram showing an example of appearance of a subject T steering a vehicle V.

As shown in FIG. 1, disease-condition assessment system S includes an information processing server device 10 (an example of a disease-condition assessment device), mobile terminal devices 20, in-vehicle terminal devices 30, home terminal devices 40, and a medical institution server device 50. The information processing server device 10 assesses disease condition of each subject T from various data of each of the subjects T driving vehicles V. Each mobile terminal device 20, which is carried by each subject T and transmits the physiological data of each subject T to the information processing server device 10. Each in-vehicle terminal device 30 collects data on the operation and movement of the vehicle V driven by the subject T from a plurality of sensors. Each home terminal devices 40 collects the physiological data, etc., when the subject T stays at the home H. The medical institution server device 50 is of a medical institution attended by each subject T.

Herein, examples of the vehicle V include an automobile such as passenger car, taxis, hire, truck, trailer (including tractor alone) and bus, a motorcycle (side motorized motorcycle, trike, reverse trike), bicycle, electric cart, train like a train car.

Examples of subject T include, for example, a person driving the vehicle.

The information processing server device 10 is capable of exchanging data with each mobile terminal device 20, each in-vehicle terminal device 30, each home terminal device 40, and the medical institution server device 50 over a network N using communication protocols, such as TCP/IP. The network N includes, for example, the Internet.

In the network N, driving information provision server devices (not shown) are connected. The driving information provision server devices provide road information for road states such as traffic congestion, under construction, etc. The meteorological server devices (not shown) provide meteorological data to the information processing server device 10.

Incidentally, the network N may include, for example, a dedicated communication line, a mobile communication network, and a gateway. The network N may include access points Ap. For example, the mobile terminal device 20 and the in-vehicle terminal device 30 may be connectable to the network N through the access point Ap.

The information processing server device 10 has a function of a computer. The information processing server device 10 acquires operation-quantity data of each subject T operating the vehicle V and movement-quantity data of movement of each vehicle V. The information processing server device 10 acquires, for example, the operation-quantity data and the movement-quantity data from the in-vehicle terminal device 30.

In addition, the information processing server device 10 acquires data from the mobile terminal device 20 or the in-vehicle terminal device 30, which is obtained by sensing each subject T operating each vehicle V. For example, this data is the data of the seat pressure distribution on the seating surface where the subject T operating each vehicle V sits, and the rotational data for the arm rotation of the subject T operating the vehicle V.

The information processing server device 10 acquires meteorological data from the meteorological server devices. The information processing server device 10 acquires road information from the driving information provision server devices.

Each mobile terminal device 20 has a function of a computer. The mobile terminal device 20 is, for example, a smartphone or a tablet terminal. The mobile terminal device 20 collects data from each of sensors that senses the subject T. As shown in FIG. 2, there is the mobile terminal device 20 somewhere in the vehicle V; for example, in the vehicle V, the subject T may have the portable terminal device 20 in his/her pocket, in his/her bag, etc.

Each in-vehicle terminal device 30 has a function of a computer. The in-vehicle terminal device 30 is, for example, a navigation device of the vehicle V. As shown in FIG. 2, the in-vehicle terminal device 30 is installed in the vehicle V which the subject T drives. The vehicle V is, for example, a vehicle owned by the subject T himself/herself, family, acquaintance or the company, or a vehicle rented.

As shown in FIG. 2, the subject T operates the vehicle V by the steering wheel sw, accelerator pedal (also referred to as accelerator or gas pedal) (not shown), and brake pedal (not shown) of the vehicle V.

As shown in FIG. 2, the subject T wears each wearable terminal device w on both arms, when measuring the rotation of both arms of the subject T.

As shown in FIG. 2, the sheet sensor ss measures the seat pressure distribution on the seating surface where the subject T operating the vehicle V sits. The sheet sensor ss is a sheet-like sensor with pressure sensor elements distributed in two dimensions to measure the body pressure distribution. The sheet sensor ss measures the position and pressure on the surface of the sheet. Incidentally, the sheet sensor ss may be installed in the back of the seat.

The mobile terminal device 20 and the in-vehicle terminal device 30 can communicate by wireless communication. The wearable terminal device w can communicate with the mobile terminal device and the in-vehicle terminal device 30 through wireless communication. The sheet sensor ss has an interface that allows communication with the outside. The sheet sensor ss can communicate with the mobile terminal device 20 and the in-vehicle terminal device 30 through wireless communication. The sheet sensor ss may be able to communicate with the in-vehicle terminal device 30 by wire.

Each home terminal device 40 has a function of a computer. The home terminal device 40 is installed in, for example, the home H of the subject T or his/her workplace. The home terminal device 40 is, for example, a personal computer. The mobile terminal device 20 and the home terminal device 40 can communicate by wireless communication.

The medical institution server device 50 has a function of a computer. The medical institution server device 50 is installed in, for example, medical institutions such as hospitals and core centers of regional medicine. The medical institution server device 50 has electronic medical records information which records information, such as result of consultation, examination order, and results of examination on the subject T.

Herein, the operation quantity is the quantity of some operation when the subject T drives the vehicle V. The operation quantity for the vehicle includes the steering angle of the vehicle V's steering wheel, the accelerator pedal application of the vehicle V's accelerator, the operation quantity of the brake pedal, etc. The operation quantity may be any measurable data for the operation performance of the subject T.

In addition, the movement quantity is the quantity for the movement of the vehicle V. The movement quantity of the vehicle includes fluctuation on the vehicle V, inter-vehicular distance to a vehicle in front, vehicle velocity, vehicle acceleration, position in the lane, etc. Acceleration includes acceleration in the traveling direction of vehicle V, lateral acceleration in the lateral direction for the traveling direction, etc. The movement quantity may be any data from which the movement state of the vehicle V by the driving of the subject T is measured.

The operation quantity and the movement quantity are the quantities that indicate the driving characteristics of the subject T for the vehicle V.

In addition, an example of the data obtained by sensing the subject T operating the vehicle V includes the data of the seat pressure distribution on the seating surface where the subject T operating the vehicle V sits, and the rotational data of the arm rotation of the subject T operating the vehicle V, etc.

Next, an example of the disease condition includes the disease severity, such as whether the disease condition for a predetermined disease is mild enough to drive or severe enough to prevent driving. An example of the disease condition includes types of diseases, such as stroke and epileptic seizure. The disease severity in case of stroke, may be hemiplegia or diplegia, right-sided or left-sided paralysis.

Examples of the type of disease includes stroke, epileptic seizure, cardiovascular disease such as myocardial infarction, hypertension and arrhythmia, sleep apnea syndrome, dementia, declining consciousness level due to diabetes.

In addition, the type of disease may include the type of symptom. Examples of symptoms include the degree of paralysis, palpitations, shortness of breath, constipation, fever, chills, diarrhea, numbness, pain, etc. The type of disease may include the disease severity. For example, in case that the disease is stroke, it includes the levels of stroke but no paralysis, mild paralysis, and paralysis. In the disease severity, a different level ID may be used from the disease ID.

In addition, an example of disease condition includes signs of sickness, disease developing risk, and risk of symptom development for a predetermined disease. An example of disease condition may include the degree of signs of sickness, and the value of disease developing risk.

With regard to the determination of the sign of the symptom, it may be determined by a single index or combinations of indices. For example, palpitations may be determined only by heart rate, and shortness of breath may be uniquely determined by respiration rate (measured by thoracic movement, etc.). Moreover, blood pressure may be added to determine "effect due to shortness of breath".

In addition, the type of disease may include the type of organ or organ system and the type of biological function. An example of disease condition may include levels of condition of each organ or organ system and levels of condition of each biological function (for example, digestive function, cardiovascular function, function of the nervous system, metabolic function and cognitive function, etc.). These levels may be levels corresponding to the specific numerical value such as blood test, considering age and body weight of the subject T, etc.

An example of disease condition may include probability of occurrence of a predetermined disease (developing risk). Instead of value of the probability, the predetermined disease may be "sickness A is less likely to develop", "sickness A is apt to develop somewhat", "sickness A is likely to develop", "sickness A has become apparent", etc.

An example of disease condition may include multiple sickness, for example, "sickness A and sickness B are likely to develop", etc. The type of disease may be combinations of multiple diseases.

An example of disease condition may include "the risk of developing sickness A exceeded the first threshold", "the risk of developing sickness B exceeded the first threshold", . . . , "the risk of developing sickness A exceeded nth threshold", and "the risk of developing sickness B exceeded nth threshold".

An example of disease condition may include levels of physical condition. For example, regarding physical condition, it may be "health" and "poor physical condition," or it is divided into levels, such as "good, somewhat good, somewhat abnormal, abnormal," etc. In case of indicating the level of physical condition, disease name and the like may not be specified. Risks and levels are an example of quantitative assessment. In these cases, it is difficult to specify the type of disease, but it can be a preliminary condition.

As levels of physiological condition, it may be based on combinations of the number exceeding the threshold value or sickness exceeding the threshold value for each sickness.

In addition, examples of levels of physiological condition may include that value of the predetermined physiological data (or, driving-characteristic data of each subject T who is driving the vehicle V) "exceeded the first threshold", . . . , "exceeded the nth threshold". The level of the physiological condition may be based on combinations of multiple data.

In addition, not only captured in each individual physiological condition, but each of physiological conditions may be handled concurrently in a vector space (feature space of feature vectors). An index of each physiological condition may be captured in an n-dimensional vector space and may be handled like the level of the physiological condition by the positional relationship in the vector space.

[2. Configuration and Functions of Information Processing Server and Each Terminal Device]

(2.1 Configuration and Functions of Information Processing Server Device 10)

The following describes a configuration and functions of the information processing server device 10 using FIGS. 3 to 18F.

Figure 3:
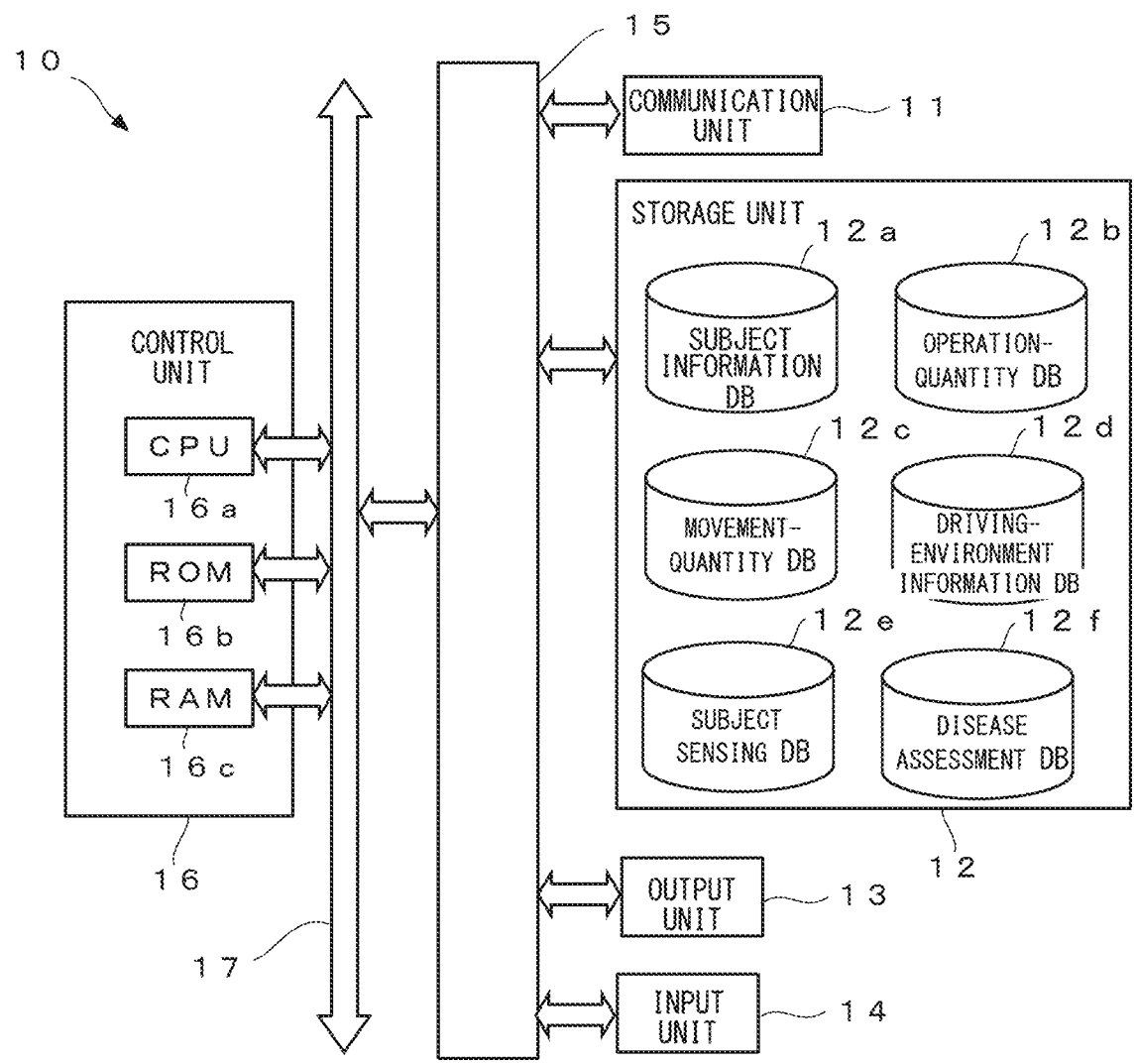
FIG. 3 is a block diagram showing an example of overview configuration of an information processing server device in FIG. 1.
Figure 4:
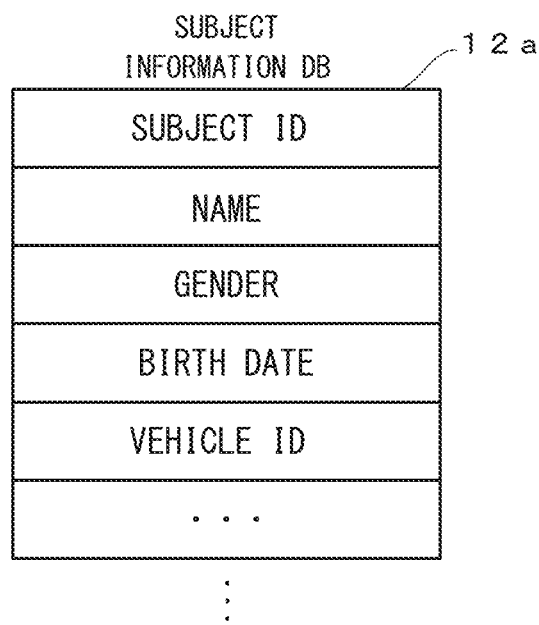
FIG. 4 is a diagram showing an example of data stored in a subject information database in FIG. 3.
Figure 5:
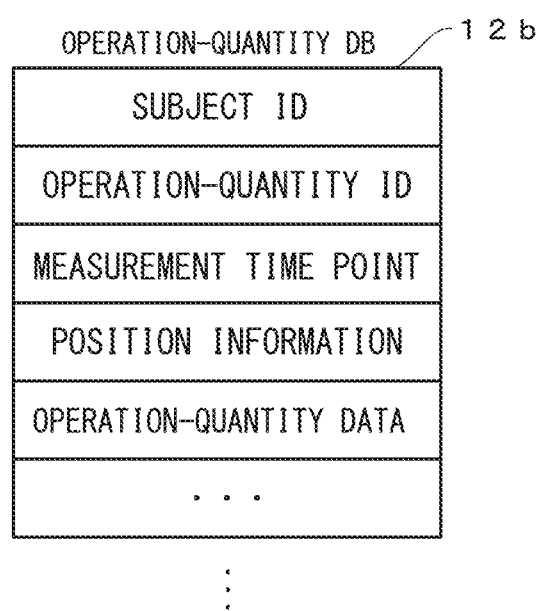
FIG. 5 is a diagram showing an example of data stored in an operation-quantity database in FIG. 3.
Figure 6:
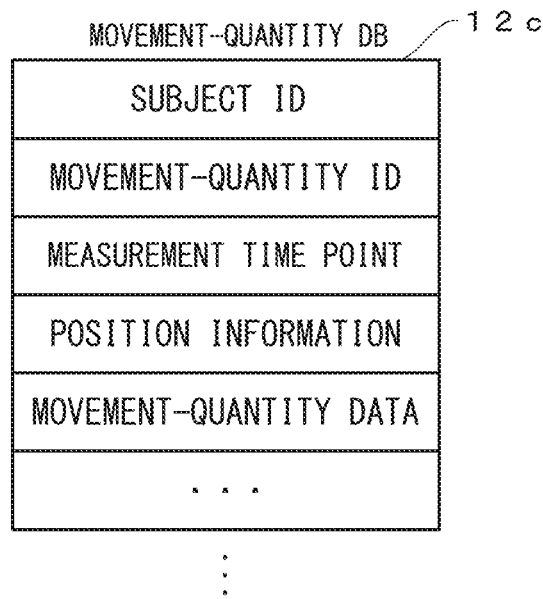
FIG. 6 is a diagram showing an example of data stored in a movement-quantity database in FIG. 3.
Figure 7:
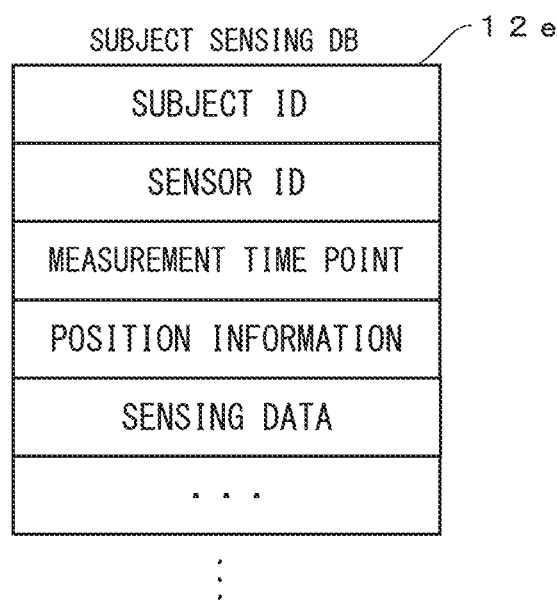
FIG. 7 is a diagram showing an example of data stored in a subject sensing database in FIG. 3.
Figure 8:
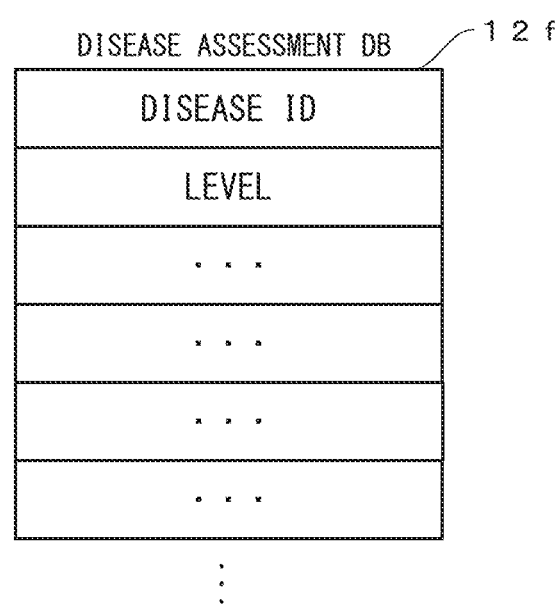
FIG. 8 is a diagram showing an example of data stored in a disease assessment database in FIG. 3.

FIG. 3 is a block diagram showing an example of overview configuration of an information processing server device 10. FIG. 4 is a diagram showing an example of data stored in a subject information database. FIG. 5 is a diagram showing an example of data stored in an operation-quantity database. FIG. 6 is a diagram showing an example of data stored in a movement-quantity database. FIG. 7 is a diagram showing an example of data stored in a subject sensing database. FIG. 8 is a diagram showing an example of data stored in a disease assessment database. FIGS. 9-12 are schematic diagrams showing an example of operation quantity-related data. FIG. 10 is a schematic diagram showing an example of operation quantity-related data. FIGS. 13-16 are schematic diagrams showing an example of movement values. FIG. 17 is a schematic diagram showing an example of subject-sensing-related data. FIGS. 18A-18F are schematic diagrams showing an example of data of seat pressure distribution.

As shown in FIG. 3, the information processing server device 10 includes a communication unit 11, a storage unit 12, an output unit 13, an input unit 14, an input/output interface unit 15, and a control unit 16. The control unit 16 and the input/output interface unit 15 are connected electrically via a system bus 17. In addition, the information processing server device 10 has a clock function.

The communication unit 11 connects to the network N electrically or electromagnetically and controls the state of communications with, for example, the mobile terminal device 20.

The storage unit 12 includes, for example, hard disk drives or solid state drivers. The storage unit 12 stores data related to each vehicle V and the data of sensing each subject T, etc. The storage unit 12 stores various programs, such as an operating system and server programs, and various files. Incidentally, the various programs may be available from, for example, another server device over the network N, or may be recorded in a recording medium and read via a drive device.

In the storage unit 12, a subject information database 12a (hereinafter, simply a "subject information DB 12a"), an operation-quantity database 12b (hereinafter, simply an "operation-quantity DB 12b"), a movement-quantity database 12c (hereinafter, simply a "movement-quantity DB 12c"), a driving-environment information database 12d (hereinafter, simply a "driving-environment information DB 12d"), a subject sensing database 12e (hereinafter, simply a "subject sensing DB 12e"), a disease assessment database 12f (hereinafter, simply a "disease assessment DB 12f"), and other databases are constructed.

The subject information DB 12a stores, for example, information concerning each of the subjects T. For example, as shown in FIG. 4, the subject information DB 12a stores the subject T's name, gender, date of birth, vehicle ID used by the subject T, etc., in association with the subject ID to identify each subject T.

The operation-quantity DB 12b stores the various operation-quantity data that the subject T on each vehicle V operated the vehicle V. For example, as shown in FIG. 5, the operation-quantity DB 12b stores measurement time points at which various operation quantities were measured while the subject T is driving the vehicle V, position information of the vehicle V, operation-quantity data, etc., in association with the subject ID and the operation-quantity ID for identifying each operation quantity. The operation-quantity ID corresponds to each operation quantity, such as the steering angle of the vehicle V's steering wheel sw, the accelerator pedal application of the vehicle V's accelerator, the operation quantity of the brake pedal, etc., and the IDs are assigned. Instead of the subject ID, it may be the vehicle ID that identifies each vehicle V. The position information of the vehicle V is latitude and longitude information or link information.

Herein, the accelerator pedal application is the quantity of accelerator pedal movement. The operation quantity of the accelerator pedal may be the number and frequency of sudden accelerations (the number and frequency of accelerations greater than or equal to a predetermined value).

The brake pedal application is the quantity of brake pedal movement. The operation quantity of the brake pedal may be the number and frequency of sudden braking (the number and frequency of decelerations greater than or equal to a predetermined value), time from when the brake is required to when the brake pedal is stepped, the time from when the accelerator pedal is stepped off to when the brake pedal is stepped on, etc.

The movement-quantity DB 12c stores the movement-quantity data indicating the movement on each vehicle V driven by the subject T. For example, as shown in FIG. 6, the movement-quantity DB 12c stores measurement time points at which movement quantities were measured while the subject T was driving the vehicle V, position information of the vehicle V, movement-quantity data, etc., in association with the subject ID and the movement-quantity ID for identifying each movement quantity. The IDs are assigned corresponding to each movement quantity, such as the fluctuation on the vehicle V, the inter-vehicular distance to a vehicle in front, the vehicle's lateral acceleration, vehicle velocity, the acceleration in the traveling direction of vehicle, etc. Instead of the subject ID, it may be the vehicle ID that identifies each vehicle V.

The driving-environment information DB 12d stores map information and driving-environment information such as road attributes or types of roads, such as whether it is a highway or a general road, the degree of curve of the road, etc., and road information of road states, such as traffic congestion, under construction, etc.

The map information may also include link information. Herein, a link is a line segment of a road that connects nodes such as road intersections, change points of road structure, etc.

In addition, an example of the degree of curvature of a road includes, for example, the curvature of the curve of the road, the average curvature in a certain section of the road, and the percentage or number of roads with curvature above a predetermined value. An example of the degree of curvature of a road may include a road with more curves or less curves simply. An example of the degree of curvature of a road may include patterns of how the road curves. An example of the degree of curvature of a road may include road classification such as roads with a high degree of curves, like the Metropolitan Expressway in Tokyo, and roads with a relatively large number of straight sections. An example of the degree of curvature of a road may include classification of road type such as a general road, a highway, the Metropolitan Expressway in Tokyo, and a mountain road. It may include classification such as a standard highway with relatively few curves and highways with relatively many curves, like the Metropolitan Expressway in Tokyo. It may include classification such as highways with frequent branches, like Tokyo's Metropolitan Expressway, and those that do not. Furthermore, a collection of road sections with curvature within a predetermined range may be used as the classification of the road.

The driving-environment information DB 12d stores the degree of curvature of the road, the type of road, etc., in association with the road classification ID indicating the classification of the road.

In addition to the above, an example of the driving-environment information includes road information such as temporary stop place, one way road, two lane road, and road with median strip. An example of the driving-environment information includes, for example, whether the width of the road is narrow or wide, whether it is a usually used road or a road used for the first time, whether there are many or few pedestrians, whether vehicle traffic volume is high or low (even if it cannot say that it is congestion). In addition, an example of driving-environment information includes, for example, information that the road is dazzling with sunlight depending on the time zone, roads where drivers get nervous easily, roads where heart rate tends to rise, length of driving time, probability of occurrence of accidents by each location. The information on traffic congestion may include information on whether traffic was congested, time zone such as rush hour, infrastructure information such as road construction and accident. Incidentally, the information processing server device 10 acquires the latest road information from the driving information provision server devices. The information processing server device 10 may store past traffic congestion information.

Next, the subject sensing DB 12e stores the data of each subject T who is driving each vehicle V, sensed by various sensors. For example, as shown in FIG. 7, the subject sensing DB 12e stores the measurement time points at which the subject T was measured by each sensor, location information of the vehicle V, sensing data, etc., in association with the subject ID and the sensor ID for identifying each sensor.

An example of the data obtained by sensing for the subject T operating the vehicle V includes the data of the seat pressure distribution on the seating surface where the subject T operating the vehicle V sits, and the rotational data of the arm rotation of the subject T operating the vehicle V, etc.

Herein, the subject sensing data may be any biological, chemical, or physical data of the subject T that can be measured by sensors, etc.

For example, an example of the subject sensing data includes body temperature and body temperature distribution of the subject T. An example of the subject sensing data includes blood-related and cardiovascular system-related data like blood pressure value, heart rate, pulse wave, pulse wave velocity electrocardiogram, arrhythmia state, blood flow rate, blood components such as blood glucose level. Examples of the blood components include red blood cell counts, white blood cell counts, platelet counts, pH value, electrolyte type, electrolyte quantity, hormone type, hormone quantity, and uric acid value, various markers, etc.

In addition, an example of the subject sensing data includes amount of perspiration, distribution of perspiration, skin resistance value, component of body odor, amount of digestive liquid such as saliva amount, components of digestive liquid such as saliva components. An example of the subject sensing data includes data on brain such as electroencephalogram, brain blood flow distribution, etc. An example of the subject sensing data includes data on respiration such as respiratory rate, respiratory volume, expiratory components, etc.

An example of the subject sensing data includes data on eyes such as number of blinks, amount of tears, eye movement (eyeball position, pupil diameter, etc.), etc. An example of the subject sensing data includes myoelectric data of each part of the body. An example of the subject sensing data includes data of facial color, facial expressions, etc.

An example of the subject sensing data includes data on sleeping such as bedtime, wakeup time, sleeping duration sleeping pattern, snoring or not, strength of snoring, number of snoring, time of snoring, state of breathing, number of turns, posture during sleep, sleep quality like sleeping depth, etc. The sleep quality may be determined from, for example, the electroencephalogram, the eye movement, the breath, the posture during sleep, etc.

An example of the subject sensing data includes weight and height, etc. In addition, an example of the subject sensing data may include numerical data of symptoms of pain, numbness, etc.

In addition, an example of the measurement time point includes a time point when the measurement was started, a time point when the measurement was completed, or an intermediate time point between them to obtain a single value of the subject sensing data. The measurement time point may be a time point corresponding to measurement of a certain value. For example, in case that heart rate is calculated every minute, it may be any time point in this one minute. In addition, examples of such time point include the peak time point of the R wave, the time point of the Q wave or the S wave, the peak time point of the P wave, etc., in case of calculating the heart rate from the length of time between the R waves in the electrocardiogram. Instead of time between R waves, it may be time between P waves, Q waves, S waves, or T waves, etc. In addition, not only in the electrocardiogram but also in graph of pulse waves, it may be a time point at which common characteristic points appear or an intermediate value as well. In case that blood pressure is measured by the Korotkoff sound, the measurement time point may be any time point within the measurement period when calculating the maximal blood pressure and the minimal blood pressure.

These subject sensing data above can be said to be the physiological data of the subject T. Incidentally, the data of seat pressure distribution may or may not be included in the physiological data.

Next, the disease assessment DB $12f$ stores the data necessary for the assessment of a predetermined disease. For example, as shown in FIG. 8, the disease assessment DB $12f$ stores the data necessary for the assessment of a predetermined disease in association with the disease ID, which indicates the type of disease, and the level of the disease.

The data necessary for the assessment of a predetermined disease includes, for example, statistically calculated operation values, movement values, and degree of laterality in the seat pressure distribution, etc., from the data of multiple subjects with the same disease ID and disease level. Based on operation-quantity data, movement-quantity data, or subject sensing data, spectral analysis, time series analysis, and other processes are performed, and statistics are calculated for multiple data. Examples of statistic include representative values such as average (arithmetic mean, geometric mean, harmonic mean, median, mode, maximum value, minimum value, etc.), dispersion, standard deviation, skewness, flatness, etc. The statistics may be calculated by performing multiple measurements on an individual subject. The operation values, the movement values, and the degree of laterality may be calculated for each classification of the road, for the operation-quantity data, movement-quantity data, or subject sensing data classified by the classification of the road.

Herein, the operation value is a value calculated from operation-related data which is data in the components of a predetermined frequency range, calculated from the operation-quantity data. The movement value is a value calculated from the movement-quantity data.

In addition, the data necessary for the assessment of a predetermined disease includes, for example, values calculated from the subject sensing data, such as operation values, movement values, and degree of laterality, as well as thresholds for these values. The data necessary for the assessment of a predetermined disease includes, for example, the frequency ranges and the predetermined frequencies when frequency analysis is performed. The data necessary for the assessment of a predetermined disease may be, for example, statistics of these values.

The data in the disease assessment DB $12f$ may be data from when the subject T drives in a driving simulator or when he/she drives on a real road. Incidentally, for example, a standard highway driving simulator course has a total course length of 15.2 km, an average radius of curvature of 1640 m, and a height difference of 0.0 m. The driving simulator course on the Metropolitan Expressway in Tokyo has a total course length of 13.2 km, an average radius of curvature of 257 m, and a height difference of 17.5 m.

Herein, the data in the disease assessment DB $12f$ is explained using FIGS. 9 to 18F, where the operation-quantity data, the movement-quantity data and subject sensing data are measured for each disease level, that is, a healthy individual p0, a stroke patient p1 whose degree of paralysis is no paralysis or mild paralysis, and a stroke patient p2 whose degree of paralysis is paralysis in case that the disease type is stroke. Incidentally, FIGS. 9 to 18 are not the graphs of the implementation data themselves, but are schematic diagrams that schematically depict the graphs in consideration of the implementation data.

Figure 9:
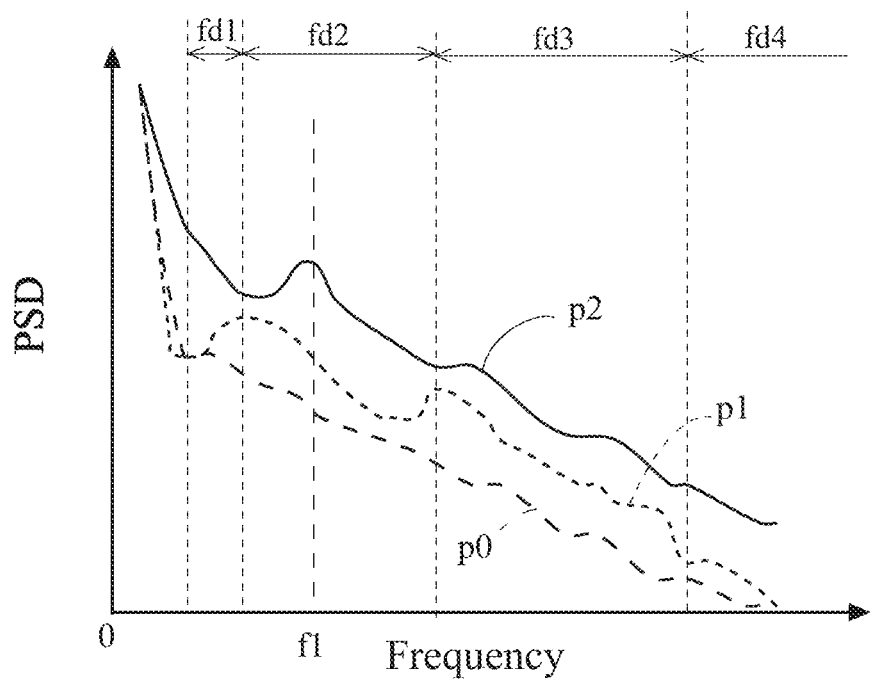
FIG. 9 is a schematic diagram showing an example of operation-quantity-related data.
Figure 10:
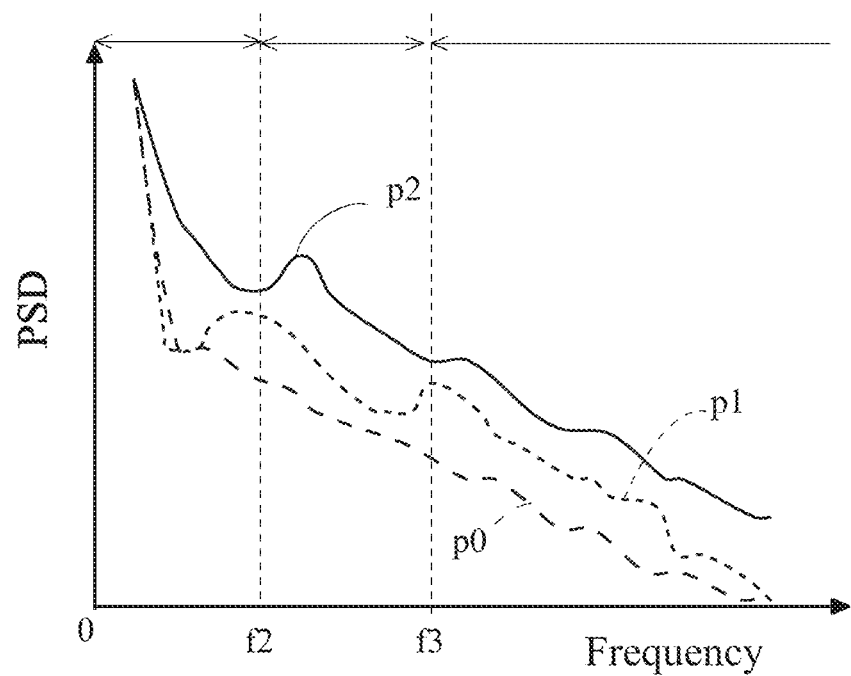
FIG. 10 is a schematic diagram showing an example of operation-quantity-related data.

FIG. 9 shows the power spectral density for steering angle data in case of driving on a given course, where the classification of the road is the standard highway, in a drive simulator. The horizontal axis is the frequency and the vertical axis is the power spectral density (PSD). The power spectral density (p0), power spectral density (p1), and power spectral density (p2) are the average power spectral densities for multiple people, respectively. That is, power spectral density (p0), power spectral density (p1), and power spectral density (p2) are, respectively, the average power spectral density of a given number of samples of healthy individuals p0, the average power spectral density of a given number of samples of patients p1, and the average power spectral density of a given number of samples of patients p2.

As shown in FIG. 9, the frequency ranges fd1, fd2, fd3, fd4, etc., are set in advance. For example, the frequency ranges fd1, fd2, fd3, and fd4 are determined in the frequency range in which the difference between the power spectral density (p0), the power spectral density (p1), and the power spectral density (p2) clearly appears. In this case, the operation-related data is, for example, the power spectral density of each frequency range fd1, fd2, fd3, and fd4. The operation value is, for example, the square root of the integrated value of the power spectral density in each frequency range fd1, fd2, fd3, and fd4. The operation value may be calculated from the difference between the power spectral densities (p0, p1, p2). For example, it can be the square root of the integrated value of the difference of the power spectral densities (p1−p0, p2−p0) in each frequency range fd1, fd2, fd3, and fd4, on the basis of the case of a healthy individual p0. The operation value may be the square root of the power spectral density (p0, p1, p2) in each frequency range. Incidentally, since it is sufficient to be able to distinguish disease conditions, the power as it is may be used without calculating the square root.

The data necessary for the determination of a predetermined disease, such as these operation values, frequency ranges and frequency values, is stored in the disease assessment DB $12f$ in association with the operation-quantity ID of the steering angle, the road classification ID indicating the road classification, and the disease ID, as the reference operation value.

Incidentally, as shown in FIG. 9, the value of each power spectral density at a predetermined frequency f1 may be used as the reference operation value.

As shown in FIG. 10, the frequency range may be divided into low-frequency, mid-frequency, and high-frequency regions according to the predetermined frequencies f2 and f3. The predetermined frequencies f2 and f3 may be common to other data or may be set individually based on the power spectral density (p0, p1, p2) for each disease level.

Figure 11:
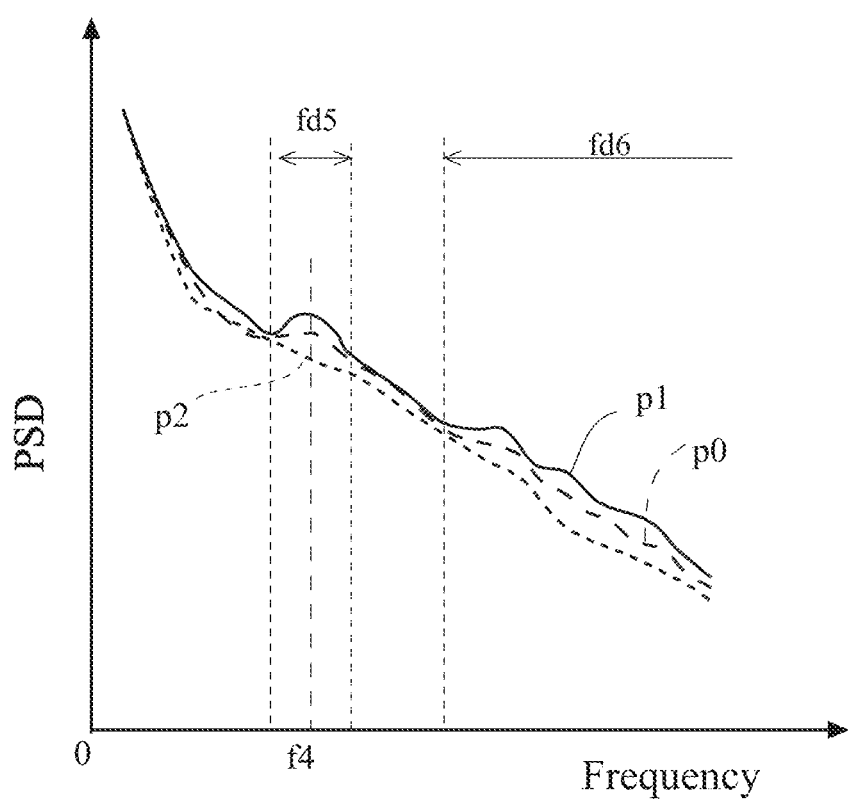
FIG. 11 is a schematic diagram showing an example of operation-quantity-related data.

FIG. 11 shows the power spectral density for steering angle data when driving on a given course, where the classification of the road is Tokyo's Metropolitan Expressway, in a drive simulator. As shown in FIG. 11, the power spectral density (p0), power spectral density (p1), and power spectral density (p2) are shown, which are different from the power spectral densities in FIG. 10 where the standard highway given course was driven.

As shown in FIG. 11, the frequency ranges fd5, fd6, etc., are set in advance. For example, the frequency ranges fd5 and fd6 are determined in the frequency range in which the difference between the power spectral density (p0), the power spectral density (p1), and the power spectral density (p2) clearly appears. The data necessary for the determination of a predetermined disease, such as these operation values, etc., is stored in the disease assessment DB 12f in association with the road classification ID indicating the road classification of the Metropolitan Expressway in Tokyo, the operation-quantity ID of the steering angle, and the disease ID, as the reference operation value.

Incidentally, compared to healthy individuals, paralytic individuals after stroke or individuals with mild paralysis after stroke tended to have a larger frequency power spectrum density of steering operations and more corrective steering operations, especially on the standard highway course with gentle curves.

Figure 12:
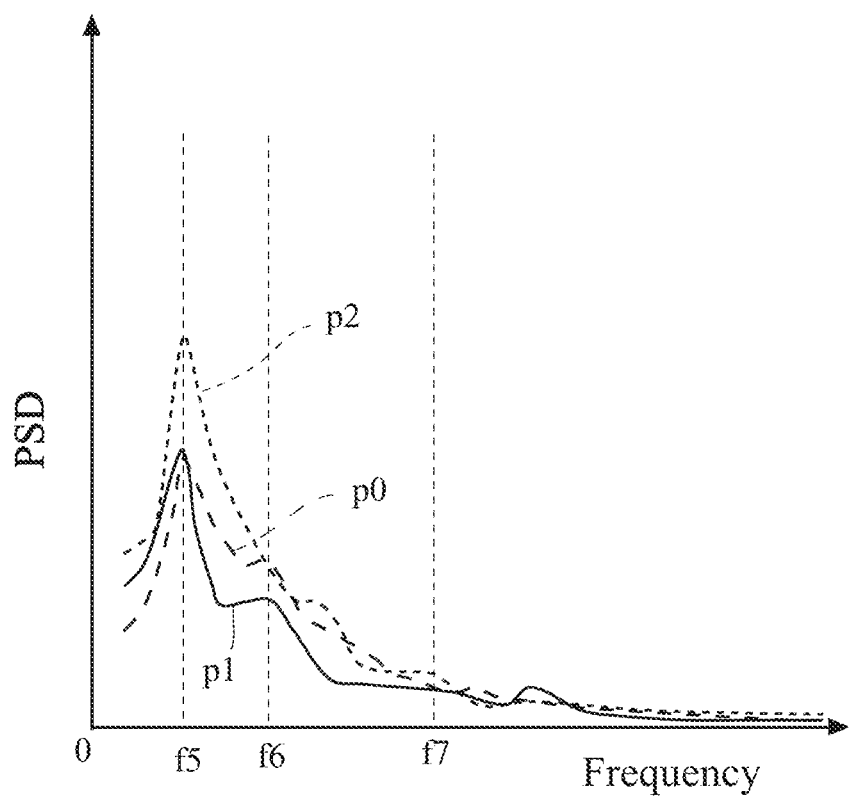
FIG. 12 is a schematic diagram showing an example of operation-quantity-related data.

FIG. 12 shows the power spectral density for operation-quantity data of the accelerator pedal application in case of driving on a given course, where the classification of the road is Tokyo's Metropolitan Expressway, in a drive simulator. For example, the frequency fd5, fd6, and fd7 are determined as shown in FIG. 12. The data necessary for the determination of a predetermined disease, such as operation values of the accelerator pedal application, the frequency fd5, fd6, and fd7, etc., is stored in the disease assessment DB 12f in association with the operation-quantity ID of the accelerator pedal application, the road classification ID indicating the road classification of the Metropolitan Expressway in Tokyo, and the disease ID, as the reference operation value.

Incidentally, compared to healthy individuals or individuals with mild paralysis after stroke, paralytic individuals after stroke tended to have a smaller frequency power spectrum density of accelerator pedal application and less fine-tuning of the accelerator pedal, when driving on a standard highway with gentle curves or the Metropolitan Expressway course with many tight curves.

Figure 13:
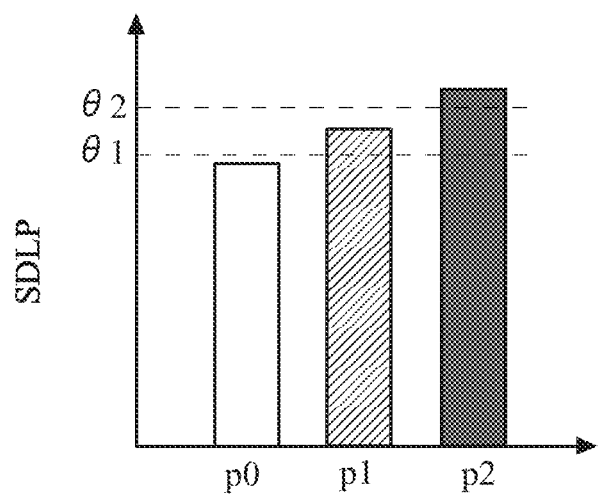
FIG. 13 is a schematic diagram showing an example of movement values.

FIG. 13 is a graph of the SDLP (Standard Deviation of Lane Position) when driving on a given course, where the classification of the road is the standard highway, in a drive simulator. Herein, the SDLP, which is the movement value, is an example of the degree of fluctuation of the vehicle V, which is calculated from the fluctuation data on the vehicle V. The SDLP is the standard deviation of the lateral position data of vehicle V (standard deviation in the left-right direction of the vehicle), which is the fluctuation data on the vehicle. The number of samples used to calculate the standard deviation is, for example, the number of data measured when driving on the course.

As shown in FIG. 13, mean values of SDLP for multiple subjects are shown for a healthy individual p0, a stroke patient p1, and a stroke patient p2. For example, the reference movement values θ1 and θ2 are set to distinguish between the healthy individual p0 and stroke patients p1 and p2. The data necessary for the determination of a predetermined disease, such as movement values θ1, θ2, and mean values of SDLP for each disease level, is stored in the disease assessment DB 12f in association with the movement-quantity ID of the SDLP, the road classification ID indicating the road classification of the standard highway, and the disease ID, as the reference movement value.

Figure 14:
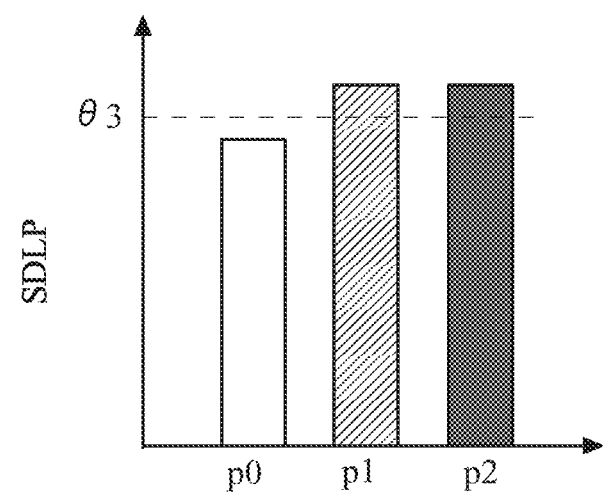
FIG. 14 is a schematic diagram showing an example of movement values.

FIG. 14 is a graph of SDLP when driving on a given course, where the classification of the road is Tokyo's Metropolitan Expressway, in a drive simulator.

As shown in FIG. 14, mean values of the SDLP for multiple subjects are shown for a healthy individual p0, a stroke patient p1, and a stroke patient p2. For example, the reference movement values θ3, etc., are set to distinguish between the healthy individual p0 and stroke patients p1 and p2. The data necessary for the determination of a predetermined disease, such as movement values θ3, and mean values of the SDLP for each disease level, is stored in the disease assessment DB 12f in association with the movement-quantity ID of the SDLP, the road classification ID indicating the road classification of the Metropolitan Expressway in Tokyo, and the disease ID, as the reference operation value.

Incidentally, when paralytic individuals after stroke drive on the standard highway course with gentle curves, the SDLP is greater than that of healthy individuals. When driving on the Metropolitan Expressway course with many tight curves, the SDLP of paralytic individuals after stroke or individuals with mild paralysis after stroke tended to be larger than that of healthy individuals.

Figure 15:
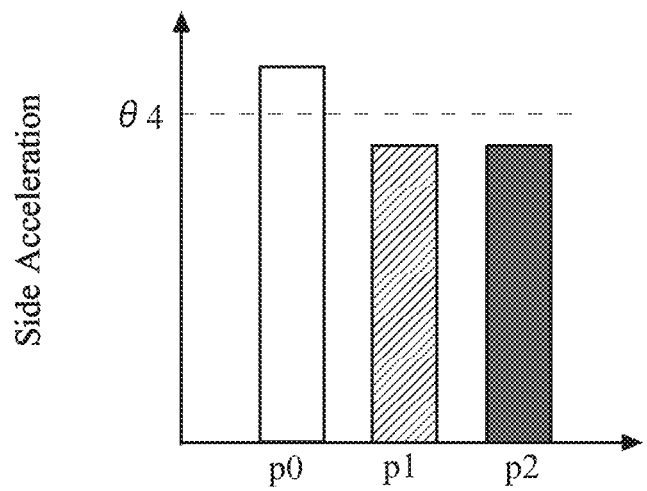
FIG. 15 is a schematic diagram showing an example of movement values.

FIG. 15 is a graph of the lateral acceleration of vehicle V when driving on a given course, where the classification of the road is the standard highway, in a drive simulator. The lateral acceleration value, which is the movement value, is calculated from the lateral acceleration data of the vehicle V by averaging the lateral acceleration data measured when driving on the course.

As shown in FIG. 15, mean values of the lateral acceleration for multiple subjects are shown for a healthy individual p0, a stroke patient p1, and a stroke patient p2. For example, the reference movement values θ4, etc., are set to distinguish between the healthy individual p0 and stroke patients p1 and p2. The data necessary for the determination of a predetermined disease, such as movement values θ4, and mean values of lateral acceleration for each disease level, is stored in the disease assessment DB 12f in association with the movement-quantity ID of the lateral acceleration, the road classification ID indicating the road classification of the standard highway course, and the disease ID, as the reference movement value.

Incidentally, when driving on the standard highway course, there was no difference in vehicle lateral acceleration between paralytic individuals after stroke or individuals with mild paralysis after stroke and healthy individuals, but when driving on the Metropolitan Expressway course, the vehicle lateral acceleration of paralytic individuals after stroke and individuals with mild paralysis after stroke tended to be smaller than that of healthy individuals.

Figure 16:
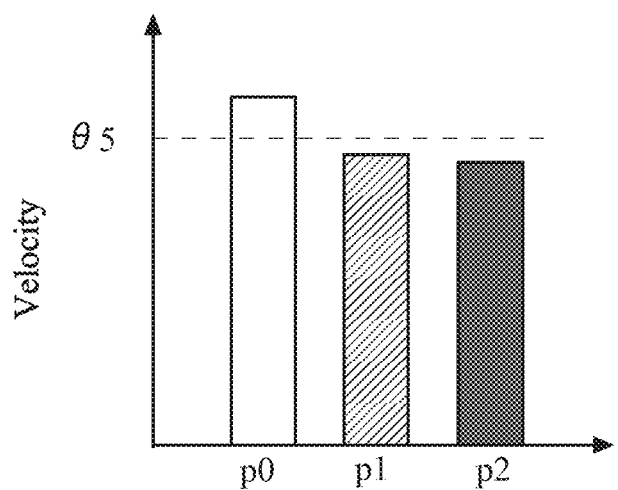
FIG. 16 is a schematic diagram showing an example of movement values.
Figure 17:
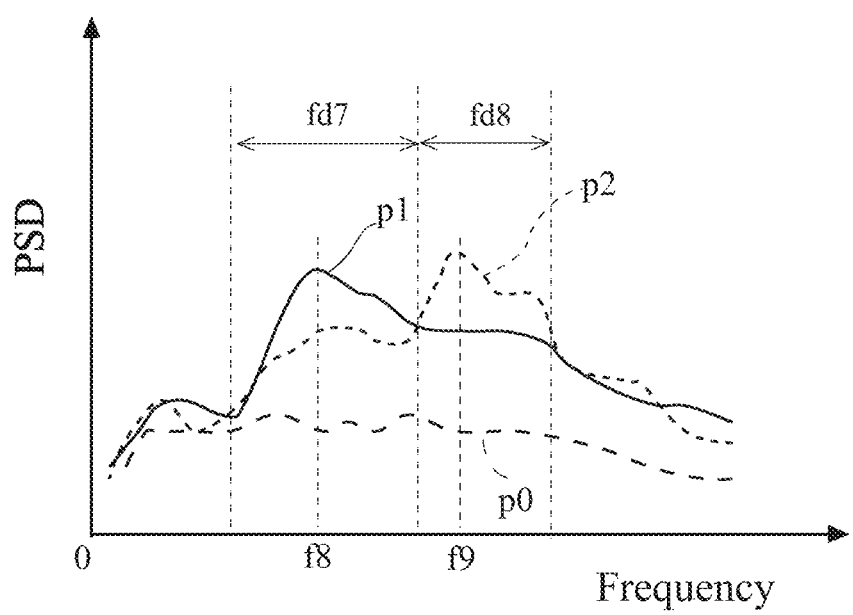
FIG. 17 is a schematic diagram showing an example of subject-sensing-related data.

FIG. 16 is a graph of the velocity of the vehicle V when driving on a given course, where the classification of the road is Tokyo's Metropolitan Expressway, in a drive simulator.

As shown in FIG. 16, for example, the reference movement values θ5, etc., are set to distinguish between the healthy individual p0 and stroke patients p1 and p2. The data necessary for the determination of a predetermined disease, such as movement values θ5, and mean values of the vehicle velocity for each disease level, is stored in the disease assessment DB 12f in association with the movement-quantity ID of the vehicle velocity, the road classification ID indicating the road classification of the standard highway, and the disease ID, as the reference movement value.

Incidentally, when driving on the Metropolitan Expressway course, the vehicle velocity of paralytic individuals after stroke and individuals with mild paralysis after stroke tended to be smaller than that of healthy individuals.

For other operation-quantity data and movement-quantity data, operation values, movement values, threshold values, etc., are set in the same way and stored in the disease assessment DB 12f.

FIG. 17 shows the power spectrum (an example of subject sensing-related data) for rotational data of an arm (arm without paralysis due to stroke) when driving on a given course, where the classification of the road is Tokyo's Metropolitan Expressway, in a drive simulator. For example, the frequency range fd7, fd8, and frequency values f8, f9 are determined in advance, as shown in FIG. 17. The data necessary for the determination of a predetermined disease, such as subject sensing value obtained by making the rotation data a numerical value, the frequency range fd7, etc., is stored in the disease assessment DB 12f in association with the sensor ID corresponding to rotational data of the arm, the road classification ID indicating the road classification of the Metropolitan Expressway in Tokyo, and the disease ID, as the reference subject sensing value. As shown in FIG. 17, the hemiplegia in the opposite side to the subject T's arm on which the sensor for rotational data is attached causes a difference in the power spectrum in the frequency range fd7. In the frequency range fd7, for example, the sum of the power spectral densities (p0) is the smallest and the sum of the power spectral densities (p1) is larger than the sum of the power spectral densities (p2). In the frequency range fd8, for example, the sum of the power spectral densities (p0) is the smallest and the sum of the power spectral densities (p2) is larger than the sum of the power spectral densities (p1). In the frequency range fd8, the value of power spectral density (p0) is the smallest and the value of power spectral density (p1) is larger than the value of power spectral density (p2). In the frequency range fd9, the value of power spectral density (p0) is the smallest and the value of power spectral density (p2) is larger than the value of power spectral density (p1).

Figure 18A:
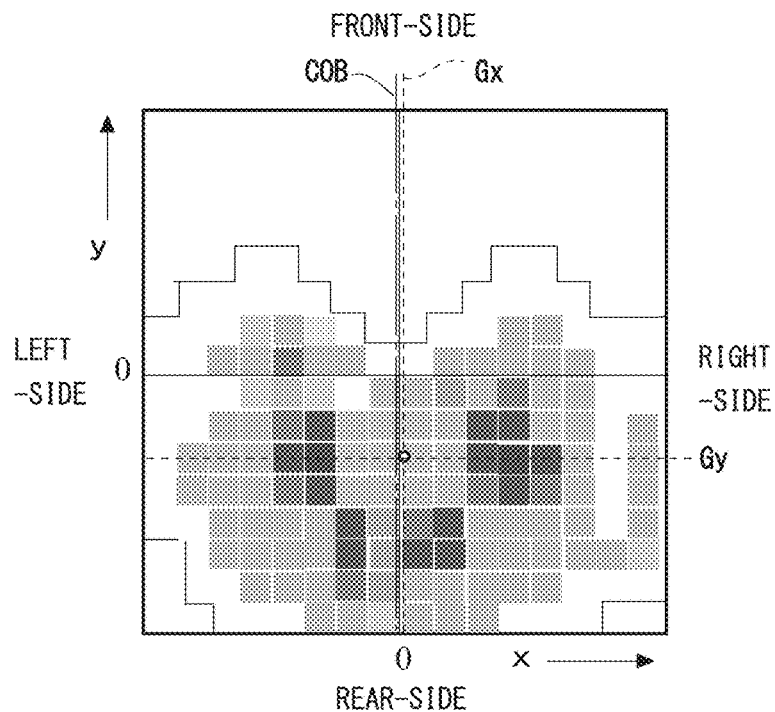
FIG. 18A is a schematic diagram showing an example of data of seat pressure distribution.

FIG. 18A is an example of the data of the seat pressure distribution measured by the sheet sensor ss when a healthy individual p0 drives a driving simulator on a given course where the road classification is a standard highway. The degree of laterality (an example of subject sensing values) calculated from the data of the seat pressure distribution as shown in FIG. 18A is averaged over multiple measurements. The multiple measurements may be multiple measurements on the same person, or on multiple people with the same attributes. The data necessary for the determination of a predetermined disease, such as average of the degree of laterality, etc., is stored in the disease assessment DB 12f in association with the sensor ID corresponding to the sheet sensor ss, the road classification ID, and the disease ID, as the reference subject sensing value.

Herein, the degree of laterality is calculated from the center position of the seat pressure distribution. The center position is, for example, the shape center position calculated from the shape of the seat pressure distribution. The shape center position is, for example, the COB (Center of Body), as shown in FIG. 18a. The COB is the vertical line in the figure. In this case, the degree of laterality is the value of the position of the COB in the x-axis, starting from the origin (0, 0) of the sheet sensor ss, which is an example of the center of lateral position of the vehicle V's seat. Incidentally, as shown in FIG. 18A, the COB is determined from the concave portion of the distribution shape. The front side, rear side, left side, and right side in the figure represent the orientation of the subject T when he or she sits in the seat.

In addition, the center position may be, for example, the seat-pressure center position of the seat pressure distribution calculated from the seat pressure distribution. The seat-pressure center position is, for example, the center of gravity (Gx, Gy) of the seat pressure distribution. The center of gravity of the seat pressure distribution is a weighted average of the position of each point in the heat map of seat pressure with the value of the heat map at that position as the weight. In this case, the degree of laterality is the value Gx of the position of the center of gravity in the x-axis, starting from the origin (0, 0) of the sheet sensor ss. Incidentally, the seat-pressure center position may be a value calculated from the entirety of each point of the seat pressure heat map of the seat pressure distribution.

In addition, the degree of laterality may be the difference between the shape center position and the seat-pressure center position. For example, the degree of laterality is Gx-COB or COB-Gx.

Incidentally, in case that a healthy individual drove on a standard highway course with gentle curves, the seat-pressure center position Gx and the shape center COB of the seat pressure distribution tended to be near the center of lateral position of the seat (near the origin of the sheet sensor ss).

Figure 18B:
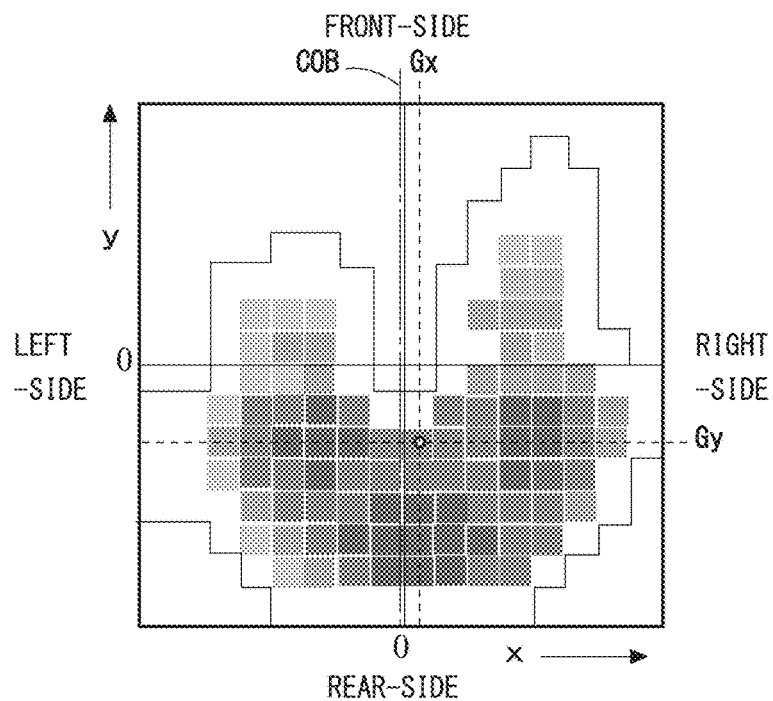
FIG. 18B is a schematic diagram showing an example of data of seat pressure distribution.

FIG. 18B is an example of the data of the seat pressure distribution measured by the sheet sensor ss when a stroke patient p1 drives a driving simulator on a given course where the road classification is a standard highway.

Incidentally, in case that an individual with mild paralysis drove on a standard highway course with gentle curves, the seat-pressure center position Gx and the shape center COB of the seat pressure distribution tended to be near the center of lateral position of the seat (near the origin of the sheet sensor ss), just like a healthy individual.

Figure 18C:
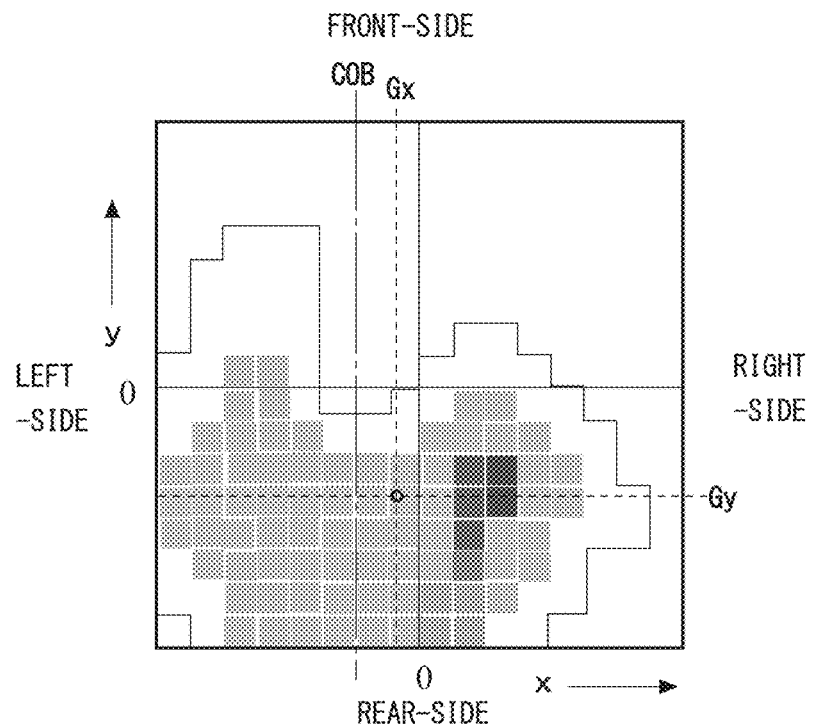
FIG. 18C is a schematic diagram showing an example of data of seat pressure distribution.

FIG. 18C is an example of the data of the seat pressure distribution measured by the sheet sensor ss when a stroke patient p2 (right-sided paralysis) drives a driving simulator on a given course where the road classification is a standard highway. Incidentally, as shown in FIG. 18C, in case that an individual with right-side paralysis drove on a standard highway course with gentle curves, the seat-pressure center position Gx and the shape center COB of the seat pressure distribution tended to be biased to the left from the lateral center of the seat (near the origin of the sheet sensor ss).

Figure 18D:
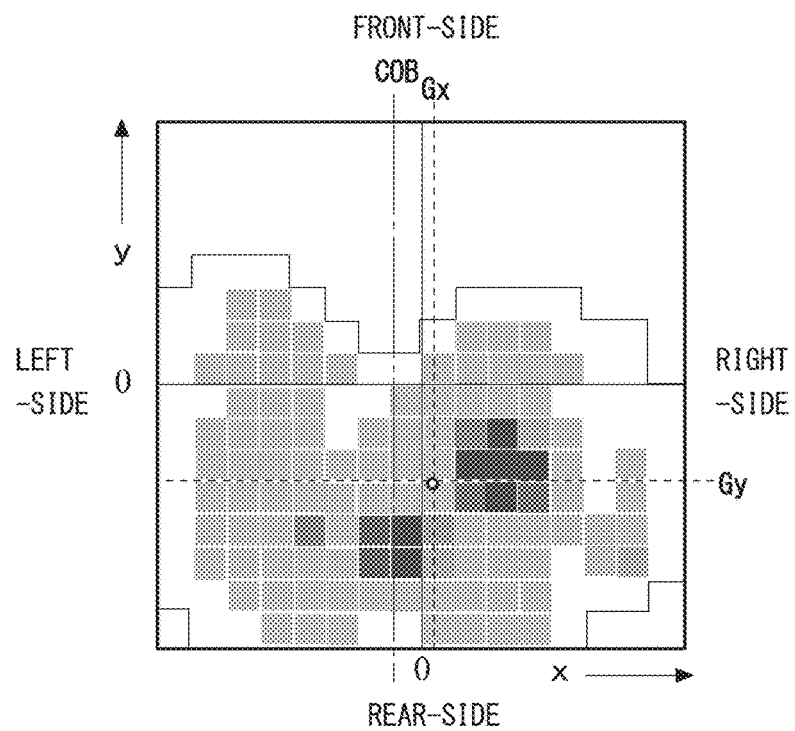
FIG. 18D is a schematic diagram showing an example of data of seat pressure distribution.

FIG. 18D is an example of the data of the seat pressure distribution measured by the sheet sensor ss when a healthy individual p0 drives a driving simulator on a given course where the road classification is Tokyo's Metropolitan Expressway. Incidentally, as shown in FIG. 18D, in case that a healthy individual drove on the Metropolitan Expressway course with a small radius of curvature and many tight curves, the seat-pressure center position Gx and the shape center COB of the seat pressure distribution tended to be near the center of lateral position of the seat (near the origin of the sheet sensor ss).

Figure 18E:
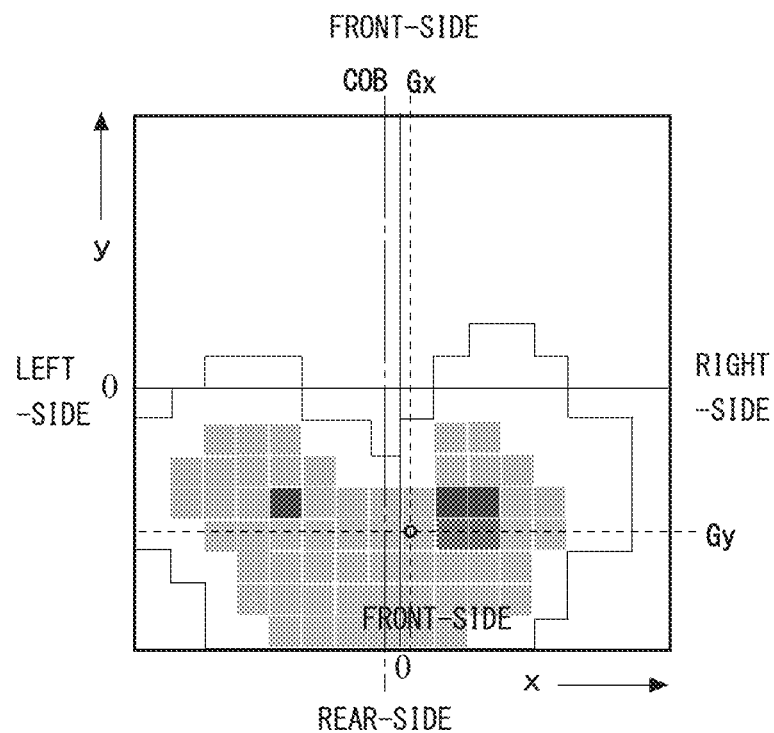
FIG. 18E is a schematic diagram showing an example of data of seat pressure distribution.

FIG. 18E is an example of the data of the seat pressure distribution measured by the sheet sensor ss when a stroke patient p1 drives a driving simulator on a given course where the road classification is Tokyo's Metropolitan Expressway. Incidentally, as shown in FIG. 18E, in case that an individual with mild paralysis drove the Metropolitan Expressway course with a small radius of curvature and many tight curves, the seat-pressure center position Gx and the shape center COB of the seat pressure distribution tended to be near the center of lateral position of the seat (near the origin of the sheet sensor ss), just like a healthy individual.

Figure 18F:
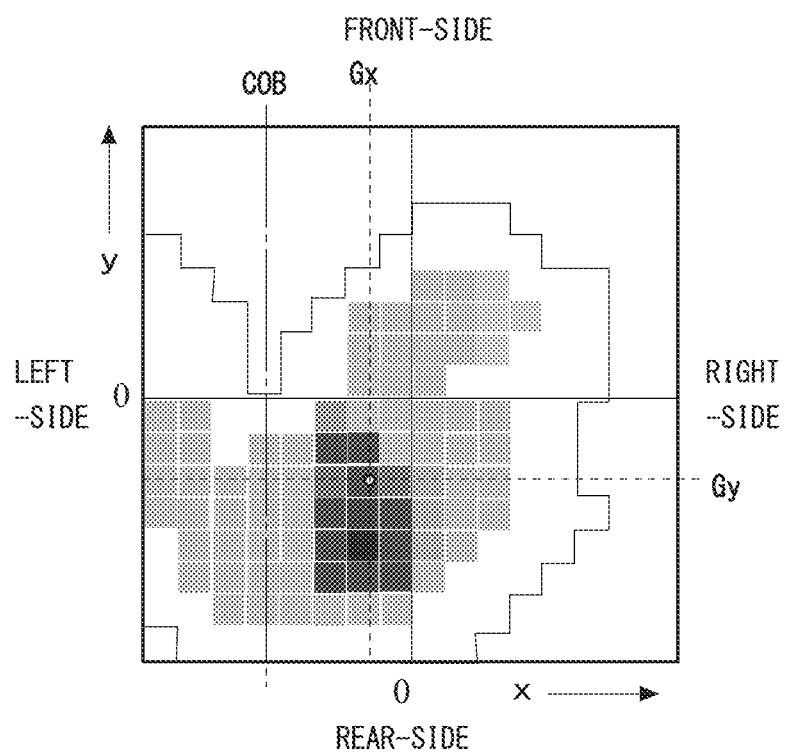
FIG. 18F is a schematic diagram showing an example of data of seat pressure distribution.

FIG. 18F is an example of the data of the seat pressure distribution measured by the sheet sensor ss when a stroke patient p2 (right-sided paralysis) drives a driving simulator on a given course where the road classification is Tokyo's Metropolitan Expressway. Incidentally, as shown in FIG. 18F, in case that an individual with right-side paralysis drove on a Metropolitan Expressway course with a small radius of curvature and many tight curves, the seat-pressure center position Gx and the shape center COB of the seat pressure distribution tended to be biased to the left from the lateral center of the seat (near the origin of the sheet sensor ss).

For the data of the seat pressure distribution as shown in FIG. 18B to 18F, the respective degrees of laterality are also averaged for multiple measurements. The data necessary for the assessment of a predetermined disease, such as the averaged degree of laterality, is stored in the disease assessment DB 12f in association with the sensor ID corresponding to the sheet sensor ss, each road classification ID, and each disease ID, as the reference subject sensing value.

In this manner, the disease assessment DB 12f is an example of the storage means storing information on the relationship between the disease condition of a predetermined disease and the data of the seat pressure distribution measured in advance. The components of a predetermined frequency range are determined depending on a predetermined disease.

The subject information DB 12a, the operation-quantity DB 12b, the movement-quantity DB 12c, driving-environment information DB 12d, the subject sensing DB 12e and disease assessment DB 12f may exist in the information processing server device 10, exist in another server connected to information processing server device 10 via a network, or be distributed in the network N. These may be separate databases, or be in the same database.

The output units 13 has, for example, liquid crystal display elements or electroluminescence (EL) devices in case of outputting image. The output units 13 has speakers in case of outputting sound.

The input unit 14 has, for example, a keyboard and a mouse, etc.

The input/output interface unit 15 conducts interface processing between the communication unit 11, the memory unit 12, etc., and the control unit 16.

The control unit 16 has, for example a CPU (Central Processing Unit) 16a, a ROM (Read Only Memory) 16b, and a RAM (Random Access Memory) 16c. When the CPU 16a reads and executes various programs stored in the ROM 16b or the memory unit 12, the control unit 16 assesses disease condition of each subject T.

(2.2 Configuration and Functions of Mobile Terminal Device 20)

Figure 19:
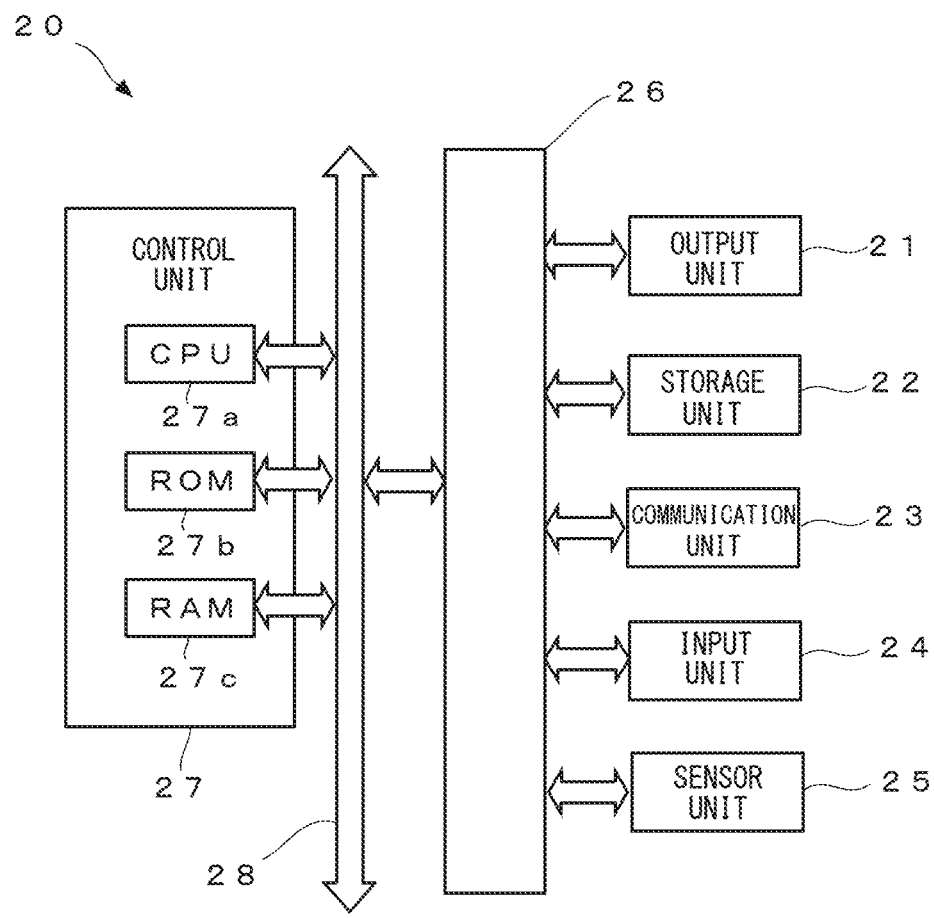
FIG. 19 is a block diagram showing an example of overview configuration of a mobile terminal device in FIG. 1.

The following describes a configuration and functions of the mobile terminal device 20 using FIG. 19.

FIG. 19 is a block diagram showing an example of overview configuration of the mobile terminal device 20.

As shown in FIG. 19, the mobile terminal device 20 includes an output unit 21, a storage unit 22, a communication unit 23, an input unit 24, a sensor unit 25, an input/output interface unit 26 and a control unit 27. The control unit 27 and the input/output interface unit 26 are connected electrically via a system bus 28. In addition, a mobile terminal ID is assigned to each mobile terminal device 20. The mobile terminal device 20 has a clock function. The mobile terminal device 20 may have a vibration function for vibrating the mobile terminal device 20.

The output unit 21 has, for example, a liquid crystal display element or an EL element as a display function. The output unit 32 has a speaker that outputs sound.

The storage unit 22 includes, for example, hard disk drives or solid state drivers. The storage unit 22 stores various programs such as an operating system and apps for the mobile terminal device 20. Incidentally, the various programs may be available from, for example, another server device over the network N, or may be recorded in a recording medium and read via a drive device. In addition, the storage unit 22 may have the information of databases like the storage unit 12 of the information processing server device 10.

The communication unit 23 connects to the network N electrically or electromagnetically and controls the state of communications with, for example, the information processing server device 10. In addition, the communication unit 23 connects to the information processing server device 10 electrically or electromagnetically and controls the state of communications with, for example, the information processing server device 10.

The communication unit 23 has a function of wireless communication for conducting communication with a terminal device by radio waves or infrared rays. The mobile terminal device 20 communicates with the in-vehicle terminal device 30 and the home terminal device 40 via the communication unit 23. In addition, as shown in FIG. 2, the mobile terminal device 20 carried by the subject T communicates with the sheet sensor ss installed in the seat where the subject T is sitting and a wearable terminal device w worn by the subject T via the communication unit 23. Incidentally, the mobile terminal device 20 may conduct wired communication with the in-vehicle terminal device 30, the home terminal device 40, the sheet sensor ss and the wearable terminal device w.

The communication unit 23 may communicate with IC tags as a leader of the IC tags.

The input unit 24 has, for example, a display panel of a touch switch type such as a touch panel. The input unit 24 acquires position information of the output unit 21 to which the user's finger touched or approached. The input unit 24 has a microphone for inputting voice sound.

The sensor unit 25 has various sensors such as a GPS (Global Positioning System) sensor, a direction sensor, an acceleration sensor, a gyro sensor, an atmospheric pressure sensor, a temperature sensor and a humidity sensor. The sensor unit 25 has imaging elements such as a CCD (Charge Coupled Device) image sensor and a CMOS (Complementary Metal Oxide Semiconductor) image sensor of a digital camera. The mobile terminal device 20 acquires current position information of the mobile terminal device 20 by the GPS sensor. Incidentally, a unique sensor ID is assigned to each sensor.

The input/output interface unit 26 conducts interface processing between the output unit 21 and the memory unit 22 etc., and the control unit 27.

The control unit 27 includes a CPU 27a, a ROM 27b, and a RAM 27c. In the control unit 27, the CPU 27a reads and executes various programs stored in the ROM 27b or the storage unit 22.

Herein, the wearable terminal device w is a wearable computer. The wearable terminal device w has an output unit, a storage unit, a communication unit, an input unit, a sensor unit, an input/output interface unit, a control unit and a timer unit (not shown).

The sensor unit of the wearable terminal device w measures various physiological data of the subject T.

The sensor unit has an acceleration sensor, a gyro sensor, a temperature sensor, a pressure sensor, an ultrasonic sensor, a light sensor, an electric sensor, a magnetic sensor, an image sensor, etc. Incidentally, a unique sensor ID is assigned to each sensor.

The acceleration sensor measures the acceleration of the wearable terminal device w. From the measurement data of the acceleration sensor, the movement of the subject T's arm is measured. The gyro sensor measures the angular acceleration of the wearable terminal device w. From the measurement data of the gyro sensor, the subject T's arm rotation is measured. The wearable terminal device w may measure the posture during sleeping, the number of turns, the number of steps, etc., by the acceleration sensor or the gyro sensor.

The temperature sensor measures the temperature of contacted parts or the temperature of parts imaged by the thermography. The pressure sensor measures, for example, pulse waves. The light sensor detects responses of irradiating the skin, etc., with electromagnetic waves, that is, at least one of a reflected wave and a transmitted wave. The light sensor measures the velocity of blood flow, blood components, etc.

The ultrasonic sensor detects responses to irradiated with ultrasonic waves, that is, at least one of a reflected wave and a transmitted wave.

The electric sensor measures voltage, current, impedance, etc. The electric sensor measures electric field generated by muscle work, blood flow, nerve excitation, etc. The electric sensor also detects components of sweat, etc., by combining with electrodes, and functions as a chemical sensor, a pH sensor, etc.

The magnetic sensor measures the magnetic field generated by muscle work, blood flow, nerve excitation, etc.

The image sensor detects the color of skin, the surface temperature, the movement of the surface, the flow of blood flow, the appearance of sweat, etc.

In addition, the sensor unit has a GPS sensor, a direction sensor, an acceleration sensor, a gyro sensor, an atmospheric pressure sensor. The wearable terminal device w may measure the moving distance, the exercise amount, etc., by these sensors.

In addition, the microphone of the input unit may capture sleeping breath and breath sound of the subject T.

The subject sensing data measured by the sensor part of the wearable terminal device w or a sensor embedded in the contact parts with the subject, such as a steering wheel, is transmitted to the mobile terminal device 20 via the communication unit. Incidentally, the wearable terminal device w may transmit the measured subject sensing data to the in-vehicle terminal device 30.

Incidentally, as a type of the wearable terminal device w, it may be a glasses type, a finger ring type, a shoe type, an in-pocket type, a necklace type, a garment type, etc., as well as the wristband type in FIG. 2.

(2.3 Configuration and Functions of In-Vehicle Terminal Device 30)

Figure 20:
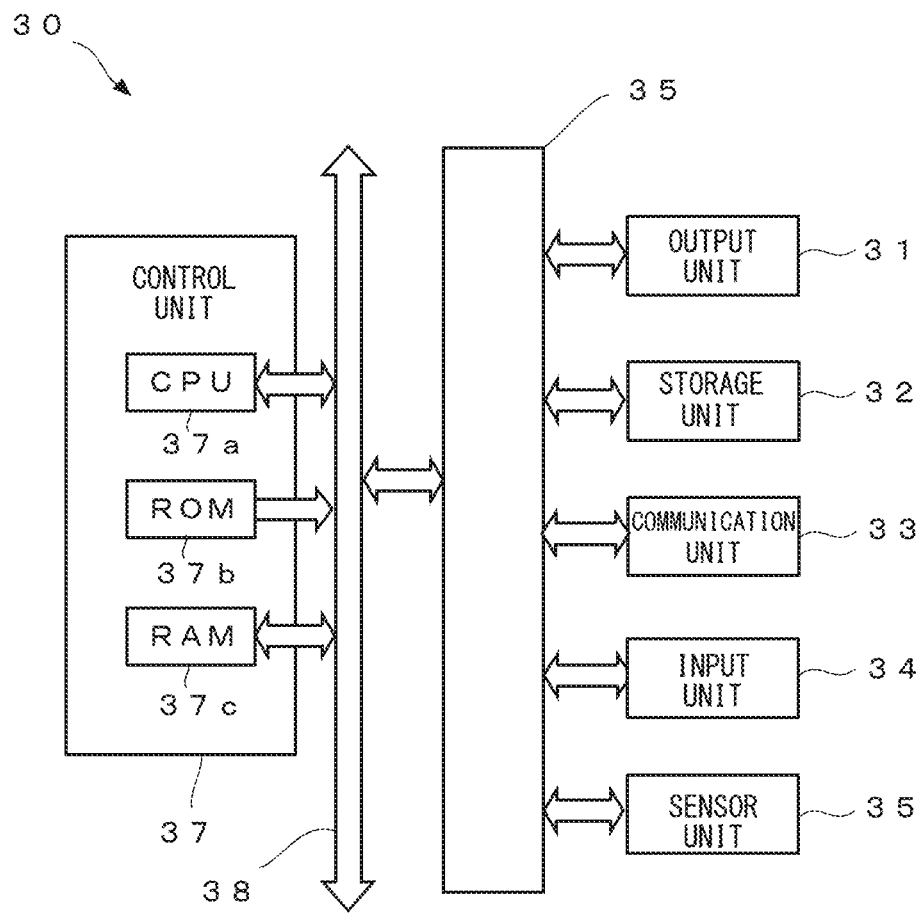
FIG. 20 is a block diagram showing an example of overview configuration of an in-vehicle terminal device in FIG. 1.

The following describes a configuration and functions of the in-vehicle terminal device 30 using FIG. 20.

FIG. 20 is a block diagram showing an example of overview configuration of the in-vehicle terminal device 30.

As shown in FIG. 20, the in-vehicle terminal device 30 includes an output unit 31, a storage unit 32, a communication unit 33, an input unit 34, a sensor unit 35, an input/output interface unit 36, and a control unit 37. The control unit 37 and the input/output interface unit 36 are connected electrically via a system bus 38. In addition, a vehicle ID is assigned to each in-vehicle terminal device 30. The in-vehicle terminal device 30 has a clock function.

As shown in FIG. 2, the in-vehicle terminal device 30 is, for example, a navigation device mounted on the vehicle V.

The output unit 31 has, for example, a liquid crystal display element or an EL element as a display function, and a speaker that outputs sound.

The storage unit 32 includes, for example, hard disk drives or solid state drivers. The storage unit 32 stores various programs such as an operating system and apps for the in-vehicle terminal device 30. Incidentally, the various programs may be available from, for example, another server device over the network N, or may be recorded in a recording medium and read via a drive device. In addition, the storage unit 32 may include the information of a database, such as the storage unit 12 of the information processing server device 10.

The storage unit 32 has map information for navigating the vehicle V.

Incidentally, in the storage unit 32, the subject information DB, the operation-quantity DB, the movement-quantity DB, the driving-environment information DB, and the subject sensing DB may be constructed for subject(s) T driving the vehicle V in which the in-vehicle terminal device 30 is installed, as in the storage unit 12.

The communication unit 33 connects to the network N electrically or electromagnetically and controls the state of communications with, for example, the information processing server device 10. In addition, the communication unit 33 connects to the information processing server device 10 electrically or electromagnetically and controls the state of communications with, for example, the information processing server device 10. The communication unit 33 controls communication with the mobile terminal device 20 by wireless communication. The communication unit 33 may communicate with the sheet sensor ss and the wearable terminal device w.

The communication unit 33 communicates with the drive mechanism of the vehicle V. For example, a control signal is transmitted to the drive mechanism of the vehicle V via the communication unit 33 of the in-vehicle terminal device 30, and the vehicle V is stopped, stopped at a predetermined place, and navigated to a predetermined place such as a hospital.

The input unit 34 has, for example, a display panel of a touch switch type such as a touch panel. The input unit 34 acquires position information of the output unit 31 to which the user's finger touched or approached. The input unit 34 has a microphone for inputting sound.

The sensor unit 35 has various sensors to measure the operation quantity, such as an angle sensor for measuring the operation angle in the steering wheel sw, an accelerator pedal application sensor to measure the operation of the accelerator pedal, and a brake pedal application sensor to measure the operation of the brake pedal.

The sensor unit 35 has various sensors that measure the movement quantity of the vehicle V, such as a GPS sensor, a direction sensor, an acceleration sensor, a gyro sensor, and a sensor for millimeter wave radar. The GPS sensor acquires the current position information of the vehicle V.

The sensor unit 35 has various sensors such as an atmospheric pressure sensor, a temperature sensor and a humidity sensor.

The sensor unit 35 has imaging elements such as a CCD image sensor and a CMOS image sensor of a digital camera. As shown in FIG. 2, the sensor unit 35 has a camera 35a and a camera 35b.

The camera 35*a* photographs circumstances outside the vehicle V. In the in-vehicle terminal device 30, the movement quantity of the vehicle V is measured by the images from the camera 35*a*. For example, fluctuation data, which is an example of movement-quantity data of the vehicle V, may be measured from images of lanes and scenery based on image data from cameras that capture the front, side, or rear of the vehicle V. The camera in the sensor unit 35 may measure the inter-vehicle distance, stop positions, and lane departure. The camera in the sensor unit 35 may measure the condition of the road surface (presence or absence of rain, presence or absence of snow, presence or absence of pavement, etc.), and measures the presence or absence of a human.

The camera 35*b* photographs subject T. From the image of the camera 35*b*, the in-vehicle terminal device 30 authenticates the subject T with facial recognition, measures the facial color of the subject T, and determines whether the subject T is dozing. In addition, the operation quantity may be measured from the movement of the subject T based on the image data of the camera that captures the interior of the vehicle V.

The input/output interface unit 36 conducts interface processing between the output unit 31 and the memory unit 32 etc., and the control unit 37.

The control unit 37 includes a CPU 37*a*, a ROM 37*b* and a RAM 37*c*. In the control unit 37, the CPU 37*a* reads and executes various programs stored in the ROM 37*b* or the storage unit 32.

[3. Operation Example of Disease-Condition Assessment System S]

The following describes an operation example of disease-condition assessment system S using figures.

(3.1 Collecting Data)

Figure 21:
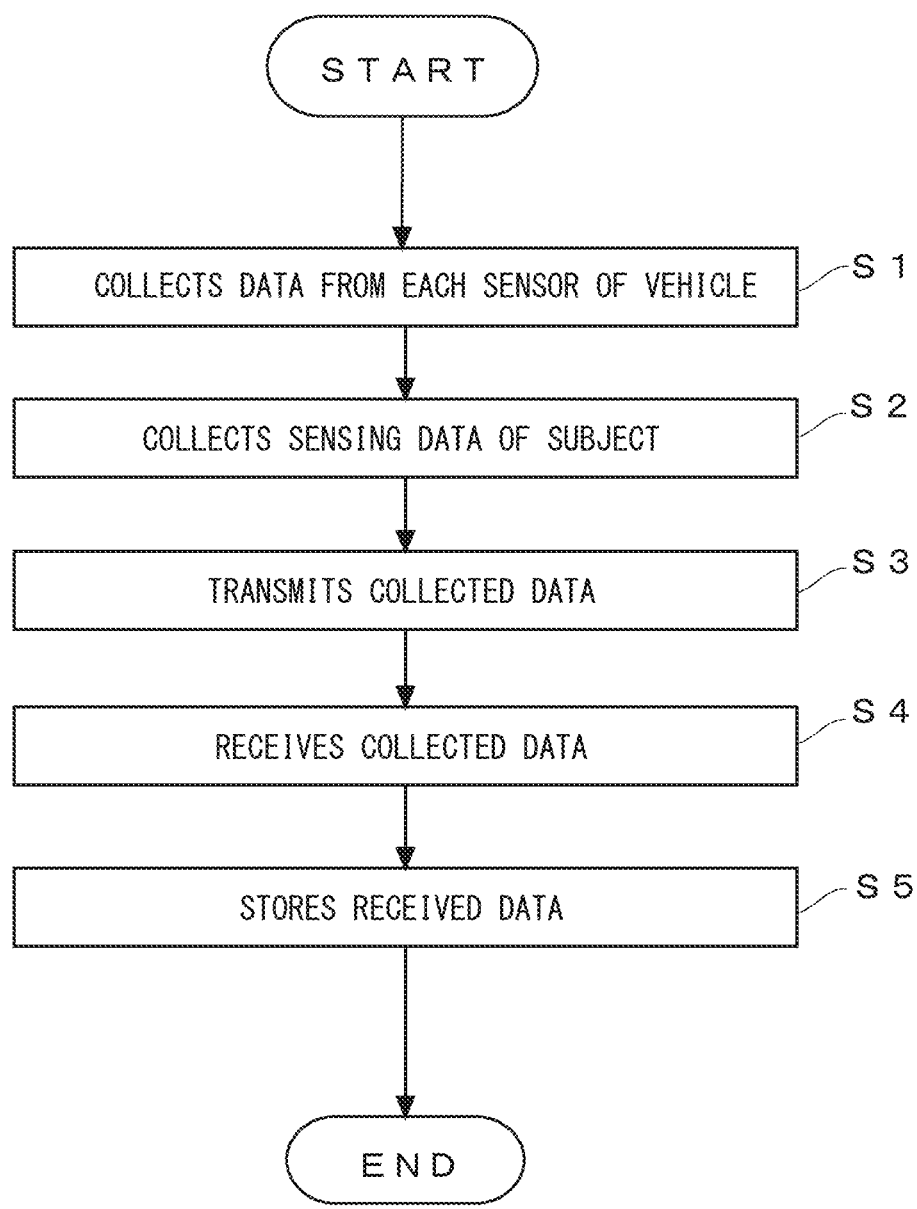
FIG. 21 is a flowchart showing an operation example of data collection.
Figure 22:
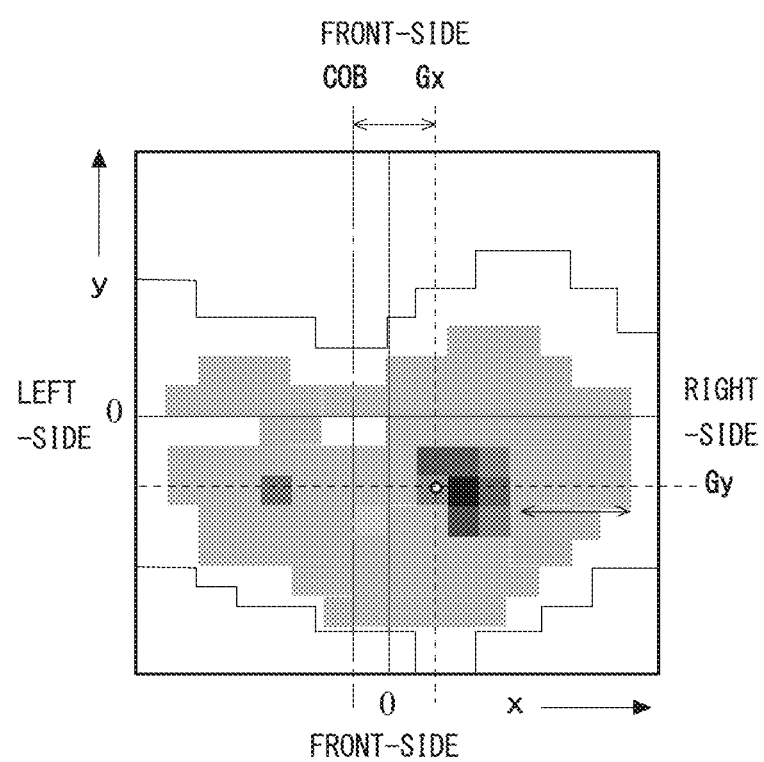
FIG. 22 is a schematic diagram showing an example of data of seat pressure distribution.
Figure 23:
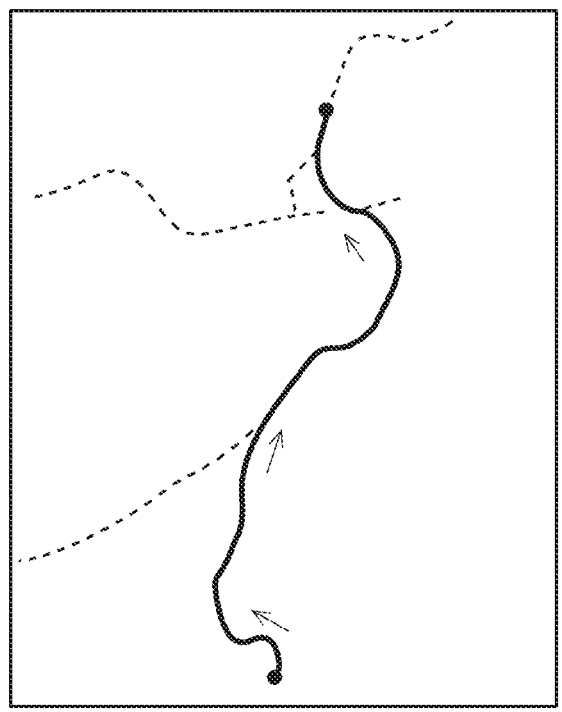
FIG. 23 is a schematic diagram showing an example of a road on which the vehicle traveled.

First, an example of the operation of collecting data, such as operation-quantity data, movement-quantity data, and subject sensing data of the subject T, is described using the figures. FIG. 21 is a flowchart showing an operation example of data collection. FIG. 22 is a schematic diagram showing an example of data of seat pressure distribution FIG. 23 is a schematic diagram showing an example of a road on which the vehicle V traveled.

As shown in FIG. 2, the subject T gets in the vehicle V, and the power supply of the in-vehicle terminal device 30 is turned on. The in-vehicle terminal device 30 identifies the driver of the vehicle V. For example, the camera 35*b* of the in-vehicle terminal device 30 may photograph the subject T and conduct face recognition. The in-vehicle terminal device 30 may communicate with the mobile terminal device 20 or the wearable terminal device w of the subject T to identify the driver. The in-vehicle terminal device 30 may identify the driver with the fingerprint recognition sensor on the steering wheel of the vehicle V. The in-vehicle terminal device 30 may identify the driver by combining these driver identification methods. The subject T may be identified by the mobile terminal ID of the mobile terminal device 20 carried by the subject T.

Incidentally, the subject T may drive in a real vehicle or in a drive simulator.

When the subject T drives the vehicle V, the in-vehicle terminal device 30 starts measuring the operation-quantity data and the movement-quantity data. The mobile terminal device 20 measures sensing data.

Next, as shown in FIG. 21, the disease-condition assessment system S collects data from each sensor of the vehicle V (Step S1). Specifically, the control unit 37 of the in-vehicle terminal device 30 acquires the data measured by each sensor of the sensor unit 35 together with the measurement time point of the clock function, from each sensor. For example, the control unit 37 acquires the operation-quantity data such as steering angle data of the operation angle in the steering wheel sw, accelerator pedal application data, brake pedal application data, etc., from each sensor of sensor unit 35 as the operation quantity of vehicle V. In addition, the control unit 37 acquires fluctuation data, current position information of the vehicle V, the traveling direction of the vehicle V, the velocity the acceleration, the inter-vehicle distance, etc., from each sensor of sensor unit 35 as the movement quantity of vehicle V.

The control unit 37 may acquire the image outside the vehicle V by the camera 35*a* of the sensor unit 35 as the fluctuation data. The control unit 37 acquires the image of the subject T by the camera 35*b*. Incidentally, the measurement time point measured by each sensor of the sensor unit 35 may be measured by the clock function of the in-vehicle terminal device 30.

Next, the disease-condition assessment system S collects the sensing data of the subject T from the sensors of the wearable terminal device w and the sheet sensor ss (Step S2). Specifically, the control unit 27 of the mobile terminal device 20 of the subject T who is driving the vehicle V acquires the sensing data measured by each of the sensors of the wearable terminal device w and the sheet sensor ss using the wearable terminal device w. The control unit 27 acquires the rotational data of the arm rotation of the subject T who is operating the vehicle V from the wearable terminal devices w on both arms. As shown in FIG. 22, the control unit 27 acquires the data of the seat pressure distribution on the seating surface where the subject T operating the vehicle V sits from the sheet sensor ss.

The measurement time may be measured by a clock function of the mobile terminal device 20 or by a clock function of the wearable terminal device w.

Next, the in-vehicle terminal device 30 acquires the sensing data via the mobile terminal device 20. Incidentally, the mobile terminal device 20 may acquire the operation-quantity data and the movement-quantity data via the in-vehicle terminal device 30.

The measured data may be stored in each terminal device. When storing the measured data in the storage unit 32, the in-vehicle terminal device 30 may store the measured data in the storage unit 32 in association with the subject ID, the operation-quantity ID, the movement-quantity ID, and the sensor ID. Alternatively, the mobile terminal device 20 may store the measured data in the storage unit 22 in association with the subject ID, the operation-quantity ID, the movement-quantity ID, and the sensor ID.

Next, the disease-condition assessment system S transmits the collected data to the information processing server device 10 (Step S3). Specifically, the in-vehicle terminal device 30 transmits the acquired data to the information processing server device 10. More specifically, the control unit 37 transmits the operation-quantity data of the vehicle V, the measurement time, the measurement position, the subject ID and the operation-quantity ID, to the information processing server device 10. The control unit 37 transmits the movement-quantity data of the vehicle V, the measurement time, the measurement position, the subject ID, and the movement-quantity ID, to the information processing server device 10. The control unit 37 transmits the data of the seat pressure distribution of the subject T, the measurement time, the measurement position, the subject ID, and the sensor ID of the data of the seat pressure distribution, to the information processing server device 10. The control unit 37 transmits the rotational data of each arm of the subject T, the measurement time, the measurement position, the subject ID, and the sensor ID of each rotational data, to the information processing server device 10. The control unit 37 transmits the other sensing data of the subject T, the measurement time, the measurement position, the subject ID, and the sensor ID, to the information processing server device 10.

The control unit 37 may transmit the vehicle ID instead of the subject ID. The mobile terminal device 20 may transmit the sensing data to the information processing server device 10. The mobile terminal device 20 may transmit the operation-quantity data and movement-quantity data.

The measured data may be transmitted to the information processing server device 10 sequentially or collectively. In the case of sequential transmission, the in-vehicle terminal device 30 may transmit a predetermined amount of data in packets, or the data may be transmitted in batches when communication is interrupted due to poor communication conditions, such as in a tunnel.

In addition, when transmitting the data collectively, the in-vehicle terminal device 30 may transmit predetermined data such as measured data in a predetermined driving section, measured data in a predetermined driving period, etc. Alternatively, the in-vehicle terminal device 30 may transmit the measured data collectively to the information processing server device 10 after driving is completed.

Next, the disease-condition assessment system S receives the collected data from the in-vehicle terminal device 30 (Step S4). Specifically, the information processing server device 10 receives the operation-quantity data of the vehicle V and the movement-quantity data of the vehicle V from the in-vehicle terminal device 30. The information processing server device 10 receives sensing data, such as data of seat pressure distribution and rotational data of the arm, from the in-vehicle terminal device 30.

The information processing server device 10 functions as an example of the seat pressure distribution acquiring means for acquiring a data of a seat pressure distribution on a seating surface where a subject operating a vehicle is seated.

Next, the information processing server device 10 stores the received data in the storage unit 12 (Step S5). Specifically, the control unit 16 of the information processing server device 10 stores the received operation-quantity data, measurement time, position information, etc., in the operation-quantity DB 12b in association with the subject ID and operation-quantity ID. The control unit 16 stores the received movement-quantity data, measurement time, position information, etc., in the movement-quantity DB 12c in association with the subject ID and the movement-quantity ID. The control unit 16 stores the received sensing data, measurement time, position information, etc., in the subject sensing DB 12e in association with the subject ID and sensor ID.

As shown in FIG. 23, the road on which the vehicle V travels is specified from the received position information of the vehicle V. Incidentally, the road to be traveled may be set in advance by the navigation function of the in-vehicle terminal device 30.

In addition, the information processing server device 10 acquires driving-environment information from the driving information provision server devices, and the data in the driving-environment information DB 12d is updated.

(3.2 Operation Example of Assessing Disease Condition)

Next, an operation example of assessing a disease condition for a particular subject T is explained using figures.

Figure 24:
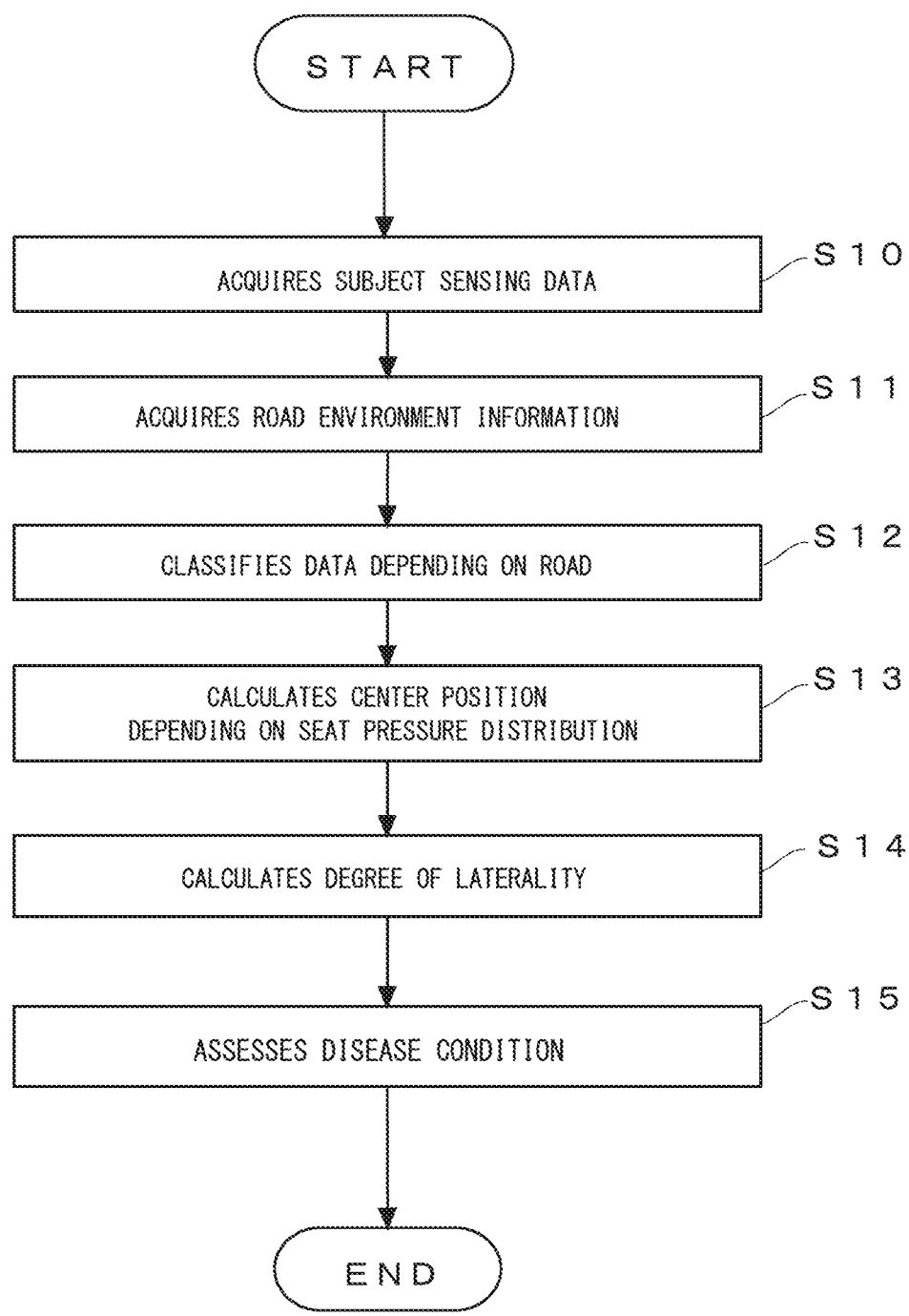
FIG. 24 is a flowchart showing an operation example of assessing the disease condition.
Figure 25:
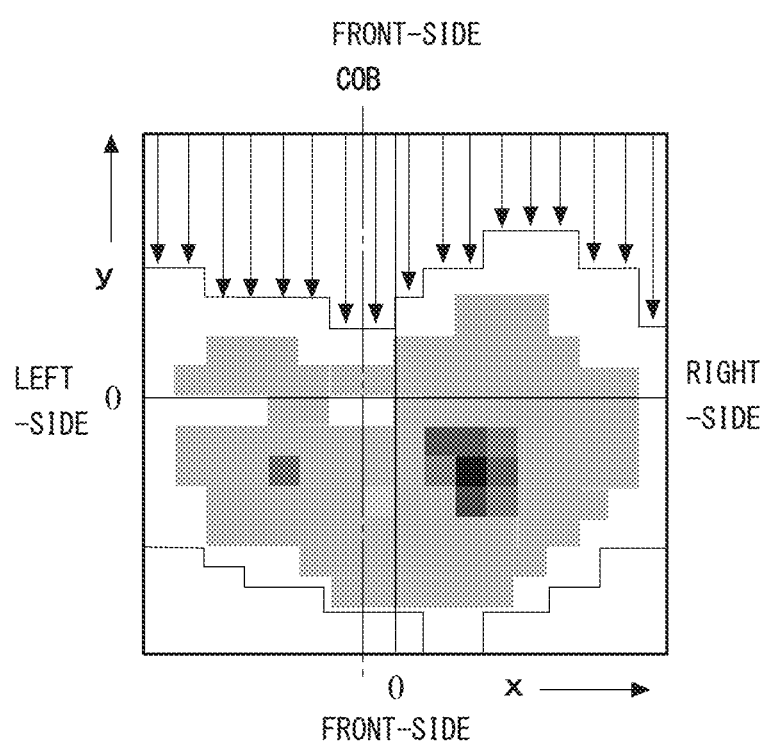
FIG. 25 is a schematic diagram showing an example of data of seat pressure distribution.
Figure 26:
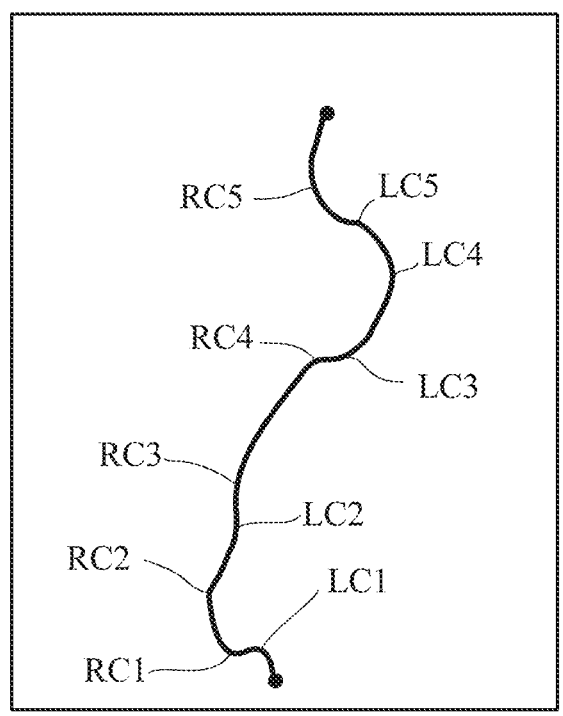
FIG. 26 is a schematic diagram showing an example of a road on which the vehicle traveled.

FIG. 24 is a flowchart showing an operation example of assessing the disease condition. FIG. 25 is a schematic diagram showing an example of data of seat pressure distribution. FIG. 26 is a schematic diagram showing an example of a road on which the vehicle traveled.

As shown in FIG. 24, the information processing server device 10 acquires the subject sensing data (Step S10). Specifically, the control unit 16 acquires each subject sensing data, such as data of seat pressure distribution, rotation data, etc., measurement time, and position information of the vehicle V based on the subject ID of the subject T and each sensor ID in the subject sensing DB 12e. For example, the control unit 16 acquires the sensing data of each subject when driving on the road as shown in FIG. 22.

In this manner, the information processing server device 10 functions as an example of the seat pressure distribution acquiring means for acquiring a data of a seat pressure distribution on a seating surface where a subject operating a vehicle is seated. The information processing server device 10 functions as an example of the physiological data acquiring means for acquiring a physiological data of the subject operating the vehicle.

Next, the information processing server device 10 acquires the operation-quantity data of the subject T operating the vehicle V (Step S10). Specifically, the control unit 16 of the information processing server device 10 acquires each operation-quantity data such as steering angle data and accelerator pedal application data, measurement time, and position information of the vehicle V based on the subject ID of the subject T and each operation-quantity ID, with reference to the operation-quantity DB 12b. For example, the control unit 16 acquires each operation-quantity data when driving on the road as shown in FIG. 22.

In this manner, the information processing server device 10 functions as an example of the operation-quantity data acquiring means for acquiring an operation-quantity data of a subject operating a vehicle.

Next, the information processing server device 10 acquires the movement-quantity data of movement of the vehicle. Specifically, the control unit 16 acquires each movement-quantity data such as fluctuation data, vehicle velocity data, lateral acceleration data, etc., measurement time, and position information of the vehicle V based on the subject ID of the subject T and each movement-quantity ID with reference to the movement-quantity DB 12c. For example, the control unit 16 acquires each movement-quantity data.

In this manner, the information processing server device 10 functions as an example of movement-quantity data acquiring means for acquiring a movement-quantity data of movement of the vehicle.

Next, the information processing server device 10 acquires the road environment information (Step S11). Specifically, the control unit 16 acquires the road environment information of the traveled road as shown in FIG. 22 with reference to the driving-environment information DB 12d.

Next, the information processing server device 10 classifies the data depending on the road (Step S12). Specifically, the control unit 16 classifies each subject sensing data based on the position information of the vehicle V at the time when these data are measured and the acquired road environment information. More specifically, the control unit 16 divides these data into each subject sensing data at traveling position of the standard highway, and each subject sensing data at traveling position of a highway with relatively many curves, like the Metropolitan Expressway in Tokyo. As described above, the control unit 16 classifies the data according to the type of the road on which the vehicle V is traveling.

The control unit 16 may calculate the curvature of the road from each position information and classify curves depending on the curvature to sort out to which section each subject sensing data belong. The control unit 16 may set roads with a predetermined curvature or less as straight and others as curved sections, and classify each subject sensing data depending on straight and curved sections. As shown in FIG. 26, curves may be classified to left curves and right curves. As shown in FIG. 26, curves may be classified for each curve above a predetermined curvature.

In this manner, the information processing server device 10 classifies subject sensing data depending on the degree of curve of the road on which the vehicle is traveling.

Next, the control unit 16 specifies the road classification ID of each classified data from the position information with reference to the driving-environment information DB 12*d*. Incidentally, from the curvature or position information, the control unit 16 may specify the road classification IDs of roads that have similar road curvature patterns.

For each operation-quantity data and each movement-quantity data, as well as each subject sensing data, it is sorted depending on the road and the road classification ID is identified.

Next, the information processing server device 10 calculates the subject sensing-related data. Specifically, the control unit 16 calculates the subject sensing-related data in the components of a predetermined frequency range from the time-series subject sensing data, such as the rotational data. For example, the control unit 16 calculates the power spectral density of each frequency by performing a discrete Fourier transform of the subject sensing data.

Next, the control unit 16 specifies the predetermined frequency range based on the road classification ID, disease ID, sensor ID with reference to the disease determination DB 12*f*.

The control unit 16 extracts the components of the power spectrum corresponding to the portion of the components in a predetermined frequency range from the power spectrum density as subject sensing-related data. For example, in case that the disease ID indicates stroke, the road classification ID indicates the Metropolitan Expressway in Tokyo, and the sensor ID indicates the rotation of the arm without paralysis due to stroke, the power spectral density in the frequency ranges fd7, etc., or in case of multiple frequency ranges (fd7, fd8), a combination of these frequency ranges is calculated as shown in FIG. 17.

Herein, subject sensing-related data is data related to the subject sensing data calculated from the subject sensing data. For example, examples of subject sensing data include data and power spectrum density obtained by discrete Fourier transforming subject sensing data, time-differentiated data obtained by time-differentiating the subject sensing, and time-integrated data obtained by time-integrating the subject sensing data. One example of subject sensing-related data in the components of a predetermined frequency range includes data in which the frequency components of a given frequency range are extracted from a spectrum or a power spectrum. The predetermined frequency range may be a single frequency or all frequencies within a range determined by sampling the data. The subject sensing-related data in the components of the predetermined frequency range may be filtered raw subject sensing data by applying a filter such as a low-pass filter, high-pass filter, or band-bass filter. For example, it may be noise cut data, emphasized data in predetermined frequency components, etc., to the raw subject sensing data. The subject sensing-related data in the components of the predetermined frequency range may be the Fourier transformed data of the subject sensing data or the power spectrum itself. Incidentally, operation-related data is data related to operation-quantity data that is calculated from operation-quantity data. The same applies to the operation-related data and the movement-related data regarding the above-mentioned subject sensing-related data.

In case that the operation-quantity data is steering angle data, the operation-related data may be the steering angular velocity calculated from the time-differentiating of the steering angle data.

Next, the information processing server device 10 calculates a center position depending on the seat pressure distribution (Step S13). In case that the center position is the shape center position, as shown in FIG. 25, the control unit 16 scans from the maximum value of y, that is, the line in front of the subject T in order from the minimum value of x, in the distribution map of the seat pressure distribution. After scanning and reaching the outer edge of the distribution shape, the control unit 16 stores the value of y, along with the value of x, as the distance from the frontal line to the outer edge of the distribution shape. The control unit 16 increments the value of x and scans from the frontal line. The control unit 16 repeats scanning these up to the maximum value of x. After the scanning is completed, the control unit 16 calculates the x position where the distance from the frontal line to the outer edge of the distribution shape becomes maximal, as the shape center position of the distribution shape. As shown in FIG. 25, if the maximal value is two or more, the averaged position is the shape center position. Incidentally, the method of calculating the shape center position is not limited to the above method, but it is sufficient if the concave portion of the distribution shape that separates the left and right sides of the seat pressure distribution can be calculated.

The outer edge of the distribution shape is where the seat pressure value is equal to or higher than a predetermined value in the distribution map of the seat pressure distribution. Incidentally, the control unit 16 may calculate a plurality of positions in the x-direction of the concave portion of the distribution shape by varying the predetermined value, and use the averaged position as the shape center position.

In case that the center position is the seat-pressure center position, the control unit 16 calculates the distribution shape center of gravity (Gx, Gy) as the seat-pressure center position from the value and position of each pixel in the distribution map of the seat pressure distribution, as shown in FIG. 22.

In this manner, the information processing server device 10 functions as an example of the center position calculating means for calculating a center position depending on the seat pressure distribution.

Next, the information processing server device 10 calculates a degree of laterality as the subject sensing value (Step S14). Specifically, the control unit 16 calculates the difference between the shape center position and the seat-pressure center position. For example, as shown in FIG. 22, the control unit 16 calculates Gx-COB or COB-Gx as the degree of laterality. As shown in FIG. 22, in case that the center position is the shape center position, the control unit 16 sets the value of the position of the COB in the x-axis as the degree of laterality, starting from the origin (0, 0). As shown in FIG. 22, in case that the center position is the seat-pressure center position, the control unit 16 sets the value Gx of the position of the center of gravity in the x-axis as the degree of laterality, starting from the origin (0, 0).

The degree of laterality may be the average of each road classification when driving on the road indicated by the road classification ID. The degree of laterality may be an average in the degree of curve of similar roads in the measurement section. In case that the control unit 16 calculates the mean, it may also calculate the standard deviation.

In this manner, the information processing server device 10 functions as an example of the degree-of-laterality calculating means for calculating a degree of laterality in the seat pressure distribution based on the center position. The information processing server device 10 functions as an example of the degree-of-laterality calculating means for calculating the degree of laterality in the seat pressure distribution based on the center position and a center of lateral position of the vehicle's seat. The information processing server device 10 functions as an example of the degree-of-laterality calculating means for calculating a distance between the seat-pressure center position and the shape center position as the degree of laterality. The information processing server device 10 functions as an example of the degree-of-laterality calculating means for calculating the degree of laterality in the subject's right and left.

Incidentally, in case of the rotational data, the control unit 16 may calculate the total value of the sum of the power spectral densities in the frequency range fd7 and fd8, as shown in FIG. 17, as the subject sensing value. The control unit 16 calculates, for example, the value of power spectral density at frequency values f8 and f9 as the subject sensing value, as shown in FIG. 17.

Next, the information processing server device 10 calculates operation values and movement values. Specifically, the control unit 16 calculates time-series operation-related data and frequency analysis values that quantify the spectrum of operation-related data, which is a function of frequency, with reference to the disease determination DB 12f, based on the road classification ID, disease ID, and operation-quantity ID. Based on the road classification ID, disease ID, and operation-quantity ID, the control unit 16 calculates the time-series movement-quantity data and the frequency analysis value that quantifies the spectrum of the movement-quantity data, which is a function of frequency, with reference to the disease determination DB 12f.

For example, in case that the disease ID indicates stroke, the road classification ID indicates standard highway, and the operation-quantity ID indicates steering angle, the control unit 16 calculates the total value of the sum of the power spectral densities in the frequency range fd2 as shown in FIG. 9 as the frequency analysis value. In the case that the disease ID indicates stroke, the road classification ID indicates the Metropolitan Expressway in Tokyo, and the operation-quantity ID indicates the steering angle, the control unit 16 calculates the total value of the sum of the power spectral densities in the frequency ranges fd5 and fd6 as shown in FIG. 11 as the frequency analysis value.

In the case that the disease ID indicates stroke, the road classification ID indicates the Metropolitan Expressway in Tokyo, and the operation-quantity ID indicates the accelerator pedal application, the control unit 16 calculates the total value of the sum of the power spectral densities in the frequency ranges fd5 and fd6 as shown in FIG. 12 as the frequency analysis value.

Incidentally, the operation value may be the total steering quantity, which is calculated by integrating the absolute value of the steering angular velocity. The operation value may be the modified steering quantity, which is the sum of the power spectral densities in a predetermined frequency band, obtained by discrete Fourier transforming the steering angle data. The operation values may be standard deviation of steering angular velocity, steering smoothness, maximum value of steering angular velocity and steering entropy, which is the calculated entropy of steering angle data.

In addition, as a movement value, the control unit 16 calculates the degree of fluctuation (e.g., SDLP) when driving on the road indicated by the road classification ID from the fluctuation data. Incidentally, the degree of fluctuation on the vehicle V may be the number or frequency of departures from the road (frequency of sending lane departure warnings). The movement-quantity data as the inter-vehicular distance may be the value or variation degree of the inter-vehicular distance (or inter-vehicular time), the number and frequency of approaches (e.g., the inter-vehicular time is within 3 seconds, within 1 second, etc.) to the vehicle traveling in front (frequency of sending a forward collision warning). It can be the distance from the location of the pause when the car stops as movement-quantity data. From these movement-quantity data, the degree of fluctuation may be calculated as a movement value.

As a movement value, the control unit 16 calculates the average vehicle velocity when driving on the road indicated by the road classification ID from the vehicle velocity data. As a movement value, the control unit 16 calculates the average lateral acceleration value when driving on the road indicated by the road classification ID from the lateral acceleration data.

Incidentally, the control unit 16 may calculate the movement values from the movement-related data. For example, the control unit 16 calculates the total sum of the power spectral densities in a predetermined frequency range as the movement value.

Next, the information processing server device 10 assesses disease condition (Step S15). Specifically, the control unit 16 compares the reference subject sensing value with the calculated subject sensing value of the subject T with reference to the disease assessment DB 12f based on the road classification ID, disease ID, and sensor ID, and assesses disease condition, such as whether the subject T has the disease of the disease ID and the disease severity of the disease ID.

For example, in case that the road classification ID indicates a standard highway and the sensor ID indicates a sheet sensor ss, the control unit 16 compares the calculated degree of laterality with the reference degrees of literality, as shown in FIG. 18A, FIG. 18B and FIG. 18C, determines which reference degree of laterality is closest, and assesses whether the subject is a healthy individual p0, a stroke patient p1 or a stroke patient p2 (e.g., right-side paralysis). The control unit 16 may assess it based on the multiple degrees of laterality, such as the degree of laterality in the shape center position, the degree of laterality in the seat pressure center position, and the degree of laterality in difference between the shape center position and the seat-pressure center position. Based on the degree of laterality calculated from the data of the seat pressure distribution, the control unit 16 may assess whether the stroke is left-sided paralysis or right-sided paralysis, the degree of paralysis, etc.

The control unit 16 may assess the disease condition by comparing statistical values such as the mean and variance of the degree of laterality with the reference degree of laterality.

In case that the road classification ID indicates the Metropolitan Expressway in Tokyo and the sensor ID indicates the sheet sensor ss, the control unit 16 assesses whether the patient is a healthy individual p0, a stroke patient p1, or a stroke patient p2 by assessing which degree of laterality is closer by comparing it to the reference degrees of laterality as shown in FIG. 18D, FIG. 18E, and FIG. 18F.

In this manner, the information processing server device 10 functions as an example of the disease-condition assessment means for assessing a disease condition of the subject depending on the degree of laterality. The information processing server device 10 functions as an example of the disease-condition assessment means for assessing the disease condition of the subject depending on the degree of laterality calculated from the shape center position and the degree of laterality calculated from the seat-pressure center position. The information processing server device 10 functions as an example of the disease-condition assessment means for assessing the disease condition of the subject from a statistical value of the degree of laterality. The information processing server device 10 functions as an example of the disease-condition assessment means for assessing a post-stroke paralysis depending on the degree of laterality. The information processing server device 10 functions as an example of the disease-condition assessment means for assessing the degree of the post-stroke paralysis depending on the degree of laterality. The information processing server device 10 functions as an example of the disease-condition assessment means for assessing the disease condition of the subject depending on the degree of laterality in the subject's lateral.

In case that the disease ID indicates stroke, the road classification ID indicates the Metropolitan Expressway in Tokyo, and the sensor ID indicates a gyro sensor that measures the arm rotation on the side without paralysis, the control unit 16 assesses whether the subject is a stroke patient p1 by comparing the value obtained by subtracting the total power spectral density (p0) from the sensing value of the subject T in the frequency range fd7, etc., as shown in FIG. 17 with the total value of the difference in power spectral density (p1–p0). Based on the reference subject sensing values as shown in FIG. 17, the control unit 16 assesses hemiplegia in the opposite side to the subject T's arm (e.g., left side) on which the sensor for rotational data is attached. By comparing whether the subject sensing value of subject T in the frequency range fd7 and fd8 shown in FIG. 17 is closer to the total power spectral density (p1) or the total power spectral density (p2), the control unit 16 may assess the disease severity, such as whether the subject is a stroke patient p1 or a stroke patient p2.

From the subject sensing values of the rotational data measured by the gyro sensors of the left and right arms, the control unit 16 may assess the disease severity, such as whether the subject has left-sided paralysis or right-sided paralysis, or hemiplegia or diplegia. Based also on other subject sensing values, the control unit 16 may assess the disease condition of the subject.

The information processing server device 10 may assess the disease condition of the subject T by comparing the calculated degree of laterality with the reference degrees of literality, and comparing the calculated subject sensing value with the reference subject sensing value.

In this manner, the information processing server device 10 functions as an example of the disease-condition assessment means for assessing the disease condition of the subject based on the degree of laterality and a result of frequency-analyzing the physiological data. The information processing server device 10 functions as an example of the disease-condition assessment means for assessing the disease condition of the subject based on the degree of laterality and the physiological data. The information processing server device 10 functions as an example of the disease-condition assessment means for assessing a hemiplegia in the opposite side to the subject's arm on which the sensor is attached.

The following describes the case of operation-quantity data.

The control unit 16 compares the reference operation value with the calculated operation value of the subject T with reference to the disease assessment DB 12f based on the road classification ID, disease ID, and operation-quantity ID, and assesses disease condition, such as whether the subject T has the disease of the disease ID and the disease severity of the disease ID.

For example, in case that the disease ID indicates stroke, the road classification ID indicates standard highway, and the operation-quantity ID indicates steering angle, the control unit 16 assesses disease condition of either a healthy individual p0, a stroke patient p1, or a stroke patient p2, by comparing the value obtained by subtracting the total value of power spectral density (p0) from the operation value of the subject T in the frequency range fd2 as shown in FIG. 9 with the total value of the power spectral density difference (p1–p0) or the total value of the power spectral density difference (p2–p0).

Incidentally, the control unit 16 may assess the disease condition by assessing which of the power spectral density (p0), power spectral density (p1), or power spectral density (p2) the graph of the power spectral density in the frequency range fd2 is closer to. In the frequency range fd3, a distinction may be made between healthy individual p0 and stroke patients p1 and p2. In addition, the control unit 16 may use the frequency range fd1 as a parity check to distinguish between stroke patients p1 and stroke patients p2. The control unit 16 may assess the disease condition of stroke by the value of power spectral density at frequency f1.

For example, in case that the disease ID indicates stroke, the road classification ID indicates the Metropolitan Expressway in Tokyo, and the operation-quantity ID indicates the steering angle, the control unit 16 compares the operation value of the subject T with the standard operation value as shown in FIG. 11 to assess the disease condition of stroke.

In case that the disease ID indicates stroke, the road classification ID indicates the Metropolitan Expressway in Tokyo, and the operation-quantity ID indicates the accelerator pedal application, the control unit 16 compares the operation value of the accelerator pedal application of the subject T with the standard operation value as shown in FIG. 12 to assess the disease condition of stroke.

The following describes the case of movement-quantity data.

Based on the road classification ID, disease ID, and movement-quantity ID, the control unit 16 compares the reference movement value with the calculated movement value of the subject T with reference to the disease assessment DB 12f, and the control unit 16 assesses the disease condition, such as whether the subject T has the disease of the disease ID and the disease severity of the disease ID.

For example, in case that the disease ID indicates stroke, the road classification ID indicates standard highway, and the movement-quantity ID indicates SDLP, the control unit 16 assesses the disease condition of either a healthy individual p0 or a stroke patient (p1, p2) by comparing the SDLP of the subject T with the threshold values θ1 and θ2, as shown in FIG. 13. In case that the disease ID indicates stroke, the road classification ID indicates the Metropolitan Expressway in Tokyo, and the movement-quantity ID indicates SDLP, the control unit 16 assesses the disease condition of either a healthy individual p0 or a stroke patient (p1, p2) by comparing the SDLP of the subject T with the threshold 63, as shown in FIG. 14.

For example, in case that the disease ID indicates stroke, the road classification ID indicates the Metropolitan Expressway in Tokyo, and the movement-quantity ID indicates lateral acceleration, the control unit 16 assesses the disease condition of either a healthy individual p0 or a stroke patient (p1, p2) by comparing the lateral acceleration value of the subject T with the threshold 64, as shown in FIG. 15. In case that the disease ID indicates stroke, the road classification ID indicates the Metropolitan Expressway in Tokyo, and the movement-quantity ID indicates vehicle velocity, the control unit 16 assesses the disease condition of either a healthy individual p0 or a stroke patient (p1, p2) by comparing the vehicle velocity of the subject T with the threshold 65, as shown in FIG. 16.

In this manner, the information processing server device 10 functions as an example of the disease-condition assessment means for assessing the disease condition of the subject depending on the movement value. The information processing server device 10 functions as an example of the disease-condition assessment means for assessing a post-stroke paralysis from the degree of fluctuation. The information processing server device 10 functions as an example of the disease-condition assessment means for assessing a post-stroke paralysis from the lateral acceleration value.

Incidentally, the information processing server device 10 may assess the disease condition based on a single operation value, or based on multiple operation values.

For example, in case that assessments based on multiple operation values, the information processing server device 10 may assess the predetermined disease condition if the number of assessments for a predetermined disease condition (e.g., stroke patient p1) exceeds a predetermined threshold. The information processing server device 10 calculates the sum of the assessment results (number of assessments) for each operation value, assuming that the assessment result is 1 if it is a predetermined disease condition and that the assessment result is 0 if it is not a predetermined disease condition. In addition, the information processing server device 10 may set a weight for each operation value and calculate the sum of the assessment results.

As an example of assessing a disease condition based on multiple operation values, as shown in FIG. 11, the information processing server device 10 may assess a stroke patient p2 in the frequency range fd5 and a stroke patient p1 in the frequency range f6.

The information processing server device 10 may assess the disease condition based on multiple operation values at different road classifications. For example, in the data on a standard highway as shown in FIG. 9, the information processing server device 10 distinguishes between a healthy individual p0 and a stroke patient (p1, p2) by the operation value in the frequency range fd3. Next, in the data on the Metropolitan Expressway shown in FIG. 11, the information processing server device 10 distinguishes between stroke patient p1 and stroke patient p2 by the operation value in the frequency range fd6.

The information processing server device 10 may assess the disease condition based on a single movement value or based on multiple movement values. The information processing server device 10 may combine the operation value and the movement value to assess the disease condition.

For example, in case of assessments based on multiple movement values, the information processing server device 10 may assess the predetermined disease condition if the number of assessments for a predetermined disease condition (e.g., stroke patient p1) exceeds a predetermined threshold. In addition, the information processing server device 10 may set a weight for each movement value and calculate the sum of the assessment results.

In the case of assessing by combining operation values and movement values, the information processing server device 10 may assess the predetermined disease condition if the number of assessments for a predetermined disease condition (e.g., stroke patient p1) exceeds a predetermined threshold. In addition, the information processing server device 10 may set a weight for each operation value and each movement value and calculate the sum of the assessment results.

In this manner, the information processing server device 10 functions as an example of the disease-condition assessment means for assessing the disease condition of the subject depending on multiple operation values.

The information processing server device 10 may combine the operation value, the movement value, and subject sensing value to assess the disease condition. From among operation-quantity data, operation-related data, operation values, movement-quantity data, movement-related data, movement values, subject sensing data, subject sensing-related data, subject sensing values, etc., the information processing server device 10 may assess the disease condition with the best combination of feature values for a predetermined disease.

Incidentally, the information processing server device 10 may assess the disease condition by sequentially acquiring data from the in-vehicle terminal device 30 and other devices. The mobile terminal device 20 or the in-vehicle terminal device 30, as an example of a disease-condition assessment device, may assess the disease condition from the measured data instead of the information processing server device 10. In this case, the control unit 27 of the mobile terminal device 20 or the control unit 37 of the in-vehicle terminal device 30 assesses the disease condition from the measured data.

The information processing server device 10 may assess the disease condition based on the physiological data from the home terminal device 40 and the electronic medical record information from the medical institution server device 50. In particular, on the basis of the physiological data from the home terminal device 40 and the electronic medical record information from the medical institution server device 50, the information processing server device 10 may assess the disease condition.

As thus described, according to this embodiment, by acquiring a data of a seat pressure distribution on a seating surface where the subject T operating the vehicle V is seated, calculating a center position depending on the seat pressure distribution, calculating a degree of laterality in the seat pressure distribution based on the center position, and assessing a disease condition of the subject T depending on the degree of laterality, it is possible to assess the condition of a predetermined disease from data that is easy to measure, such as data of the seat pressure distribution on the seating surface where the subject operating the vehicle sits, without special equipment.

In addition, by reducing the data into the degree of laterality, the accuracy of assessing the disease condition can be improved.

In case of assessing the disease condition of the subject T depending on the degree of laterality with reference to a storage means storing information on the relationship between the disease condition of a predetermined disease and the data of the seat pressure distribution measured in advance, the condition of a predetermined disease can be assessed by applying the acquired data of the seat pressure distribution to the storage means.

In case that the center position is a shape center position calculated from a distribution shape of the seat pressure distribution, the accuracy of assessing the disease condition can be further improved by calculating the degree of laterality on the basis of the shape center position COB, which is determined from the distribution shape of the seat pressure distribution.

In case that the shape center position is a concave portion of the distribution shape, by calculating the degree of laterality on the basis of the shape center position COB, which is determined from the concave portion of the distribution shape, the accuracy of assessing the disease condition can be further improved.

In case that the shape center position is, in a distribution map of the seat pressure, a point where the distance from the frontal line in the subject to the outer edge of the distribution shape becomes maximal, the shape center position can be easily calculated.

In case that the center position is a seat-pressure center position of the seat pressure distribution, by calculating the degree of laterality on the basis of the seat-pressure center position, the accuracy of assessing the disease condition can be further improved. In addition, in case of calculating multiple center positions of shape center and seat-pressure center, the accuracy of assessing the disease condition can be further improved.

In case that the seat-pressure center position is the center of gravity of the seat pressure distribution, by setting the seat-pressure center position as the center of gravity of the seat pressure distribution, the seat-pressure center position can be easily obtained.

In case of calculating the degree of laterality in the seat pressure distribution based on the center position and a center of lateral position of the vehicle T's seat, by calculating the degree of laterality on the basis of the center of lateral position of the vehicle T's seat, the accuracy of assessing the disease condition can be further improved.

In case that the center positions are the shape center position calculated from a distribution shape of the seat pressure distribution and the seat-pressure center position of the seat pressure distribution, and the disease condition of the subject is assessed depending on the degree of laterality calculated from the shape center position and the degree of laterality calculated from the seat-pressure center position, the accuracy of assessing the disease condition can be further improved thanks to the multiple degrees of laterality.

In case that the center positions are the shape center position calculated from a distribution shape of the seat pressure distribution and the seat-pressure center position of the seat pressure distribution, and a distance between the seat-pressure center position and the shape center position is calculated as the degree of laterality, the accuracy of assessing the disease condition can be further improved thanks to the degree of laterality, which is independent of the center of lateral position of the vehicle T's seat.

In case of assessing the disease condition of the subject T from a statistical value of the degree of laterality, the accuracy of assessing the disease condition can be further improved thanks to processing the multiple degrees of laterality statistically.

In case of assessing the disease condition of the subject T from a statistical value of the degree of laterality, the accuracy of assessing the disease condition can be further improved thanks to processing the multiple degrees of laterality statistically.

In case of assessing post-stroke paralysis depending on the degree of laterality, it is possible to assess the condition of post-stroke paralysis from data that is easy to measure, such as data of the seat pressure distribution on the seating surface where the subject operating the vehicle, without special equipment.

In case of assessing the degree of the post-stroke paralysis depending on the degree of laterality, it is possible to assess the degree of the post-stroke paralysis from the degree of laterality without special equipment.

In case of calculating the degree of laterality in the subject T's lateral, and assessing the disease condition of the subject T depending on the degree of laterality in the subject T's lateral, hemiplegia on the left and right side can be assessed from the degree of laterality in the subject's lateral.

In case of assessing a post-stroke hemiplegia depending on the degree of laterality in the subject's lateral, the post-stroke hemiplegia can be assessed without special equipment.

In case that the data of the seat pressure distribution is classified depending on a degree of a road curvature of a road on which the vehicle V travels, the accuracy of assessing the disease condition can be improved.

In case of acquiring a physiological data (subject sensing data) of the subject T operating the vehicle V, and assessing the disease condition of the subject based on the degree of laterality and the physiological data, the accuracy of assessing the disease condition can be improved because of being assessed by the degree of laterality and the physiological data.

In case of frequency-analyzing the physiological data, and assessing the disease condition of the subject T based on the degree of laterality and a result of frequency-analyzing the physiological data, the accuracy of assessing the disease condition can be improved by incorporating the characteristics of the result of frequency-analysis of physiological data such as rotational data.

In case that the physiological data is a rotational data of subject T's arm rotation while operating the vehicle V, it is possible to assess the condition of post-stroke paralysis from data that is easy to measure, such as the rotational data of the arm rotation of the subject, without special equipment.

In case of assessing a hemiplegia in the opposite side to the subject T's arm on which the sensor is attached, it is possible to assess the condition of post-stroke paralysis from the rotational data of the opposite side to the paralyzed arm.

In case of acquiring an operation-quantity data of the subject T operating the vehicle V, and assessing the disease condition of the subject based on the degree of laterality and the operation-quantity data, combining the degree of laterality with the operation-quantity data can further improve the accuracy of assessment.

In case that the component of the predetermined frequency range is determined based on a predetermined disease, the accuracy of assessing the disease condition can be improved by making the predetermined frequency range correspond to the predetermined disease. In addition, by being set as the components of a predetermined frequency range, the accuracy of assessing the disease condition can be improved.

In case of assessing disease severity of the subject T as the disease condition of the subject T, the severity of a predetermined disease can be assessed from the degree of laterality as shown in FIG. 18A to FIG. 18F.

In case of acquiring a movement-quantity data of movement of the vehicle V, calculating a movement value obtained by making the movement-quantity data a numerical value from the movement-quantity data, and assessing the disease condition of the subject depending on the movement value, a predetermined disease condition can be assessed from the easily measurable data, such as the movement data of the vehicle V operated by the subject T.

In case that the movement-quantity data is a fluctuation data on the vehicle V, a predetermined disease condition can be assessed from the easily measurable data, such as vehicle V fluctuation data.

In case of calculating a degree of fluctuation on the vehicle V as the movement value from the fluctuation data on the vehicle V, and assessing a post-stroke paralysis from the degree of fluctuation, the condition of the post-stroke paralysis can be assessed from the degree of fluctuation that quantifies the fluctuation on the vehicle V.

In case that the degree of fluctuation is standard deviation in left-right direction of the vehicle V, the condition of the post-stroke paralysis can be assessed from the standard deviation in left-right direction of the vehicle V.

In case that the movement-quantity data is a lateral acceleration data of the vehicle or a velocity data of the vehicle, a predetermined disease condition can be assessed from the easily measurable data, such as lateral acceleration data of the vehicle V or velocity data of the vehicle V.

In case of calculating a lateral acceleration value of the vehicle V as the movement value from the lateral acceleration data, or a velocity value of the vehicle V, and assessing the post-stroke paralysis from the lateral acceleration value or the velocity value, the condition of the post-stroke paralysis can be assessed from the lateral acceleration value of the vehicle V that quantifies the vehicle V's lateral acceleration data or the velocity value of the vehicle V that quantifies the velocity data.

In case that the operation-quantity data is a steering angle data of the vehicle V's steering wheel, a predetermined disease condition can be assessed from the easily measurable data, such as steering angle data.

In case of calculating a frequency analysis value of the steering angle data as the operation value from the steering angle data, and assessing the post-stroke paralysis from the frequency analysis value of the steering angle data, the condition of the post-stroke paralysis can be assessed from the frequency analysis value of steering angle data that quantifies steering angle data of vehicle V.

In case that the operation-quantity data is an accelerator pedal application data of the vehicle, a predetermined disease condition can be assessed from the easily measurable data, such as accelerator pedal application data.

In case of calculating a frequency analysis value of the accelerator pedal application data as the operation value from the accelerator pedal application data, and assessing the post-stroke paralysis from the frequency analysis value of the accelerator pedal application data, the condition of the post-stroke paralysis can be assessed from the frequency analysis value of the accelerator pedal application data that quantifies the accelerator pedal application data of the vehicle.

In case that the operation-quantity data or the movement-quantity data is classified depending on a degree of a road curvature of a road on which the vehicle travels, the accuracy of assessing the disease condition can be improved.

In case of assessing the disease condition of the subject T depending on the operation value or the movement value when the vehicle V is traveling on the road where the degree of the road curvature is greater than or equal to a predetermined value, such as a mountain road or the Metropolitan Expressway in Tokyo, the accuracy of assessing the disease condition can be improved.

In case of assessing the disease condition of the subject T depending on the operation value by the operation-quantity data when the vehicle V is traveling on the road where the degree of the road curvature is less than a predetermined value, such as a standard highway with relatively few curves, the accuracy of assessing the disease condition can be improved. For example, for the Metropolitan Expressway in Tokyo shown in FIG. 11, the disease condition is assessed in the characteristic frequency range where different patterns of differences between a healthy individual p0, a stroke patient p1, and a stroke patient p2 appear even on a standard highway as shown in FIG. 9.

In case of calculating a plurality of the operation-related data, calculating a plurality of the operation value calculated from the plurality of the operation-related data, and assessing the disease condition of the subject depending on the plurality of the operation value, the accuracy of assessing the disease condition can be improved thanks to being assessed from plurality of the operation value.

In case that the operation-related data is a time-differential data of the operation-quantity data, a predetermined disease condition can be specified from the operation value that quantifies the time-differential data of the operation-quantity data. In particular, by emphasizing the high-frequency components, the accuracy of assessing the disease condition can be improved in case of diseases that are easily characterized by high-frequency components.

In case that the operation-related data is a time-integrated data of the operation-quantity data, a predetermined disease condition can be assessed from the operation value that quantifies the time-integrated data of the operation-quantity data. In particular, by emphasizing the low-frequency components, the accuracy of assessing the disease condition can be improved in case of diseases that are easily characterized by low-frequency components.

Modified Example

The following describes modified examples of disease-condition assessment.

The information processing server device 10 may apply a classifier to the measured data to assess the disease condition. The classifier can be a linear classifier or a nonlinear classifier. It may also be a machine learning classifier where the parameters of the classifier are machine learned. Machine learning includes neural networks, genetic algorithms, Bayesian networks, decision tree learning, and logistics regression.

For example, the information processing server device 10 stores the parameters of the model for machine learning in the disease assessment DB 12f by machine learning in advance with subject sensing data such as data of the seat pressure distribution, subject sensing values, etc. Incidentally, the data used for machine learning may be data classified by road classification.

The information processing server device 10 may assess the disease condition by applying a classifier with reference to the disease assessment DB 12f in step S15 to the subject sensing values, such as the degree of laterality calculated in step S14. The information processing server device 10 may assess the disease condition by applying a classifier with reference to the disease assessment DB 12f in step S15 to the subject sensing data, the operation-related data and the movement-related data which are calculated. The information processing server device 10 may assess the disease condition by applying a classifier with reference to the disease assessment DB 12f in step S15 to the data classified depending on the road in step S12. The disease condition is assessed by the classifier from each feature value such as subject sensing data operation-quantity data, and movement-quantity data.

The information processing server device 10 may assess the disease condition by applying a classifier to the multiple data such as subject sensing data, operation-quantity data, and movement-quantity data with reference to the disease assessment DB 12f. Specifically, the information processing server device 10 may assess the disease condition by applying a classifier with reference to the disease assessment DB 12f to the data in which there was a difference in the disease condition for a predetermined disease, as shown in FIGS. 9 to 18F.

In case of assessing the disease-condition of the subject by a machine learning for the data of the seat pressure distribution, the disease condition can be assessed by the waveform of the data of the seat pressure distribution, the pattern of the degree of laterality, etc. In case of assessing the disease-condition of the subject by a machine learning for the subject sensing data, the disease condition can be assessed by the waveform of the subject sensing data, the pattern of the subject sensing value, etc. By using a learned model built by machine learning on the data of the seat pressure distribution on the seating surface where the subject operating the vehicle sits, it is possible to assess the condition of a predetermined disease from data that is easy to measure, such as the data of the seat pressure distribution.

In case of assessing the disease condition of the subject by a machine learning for the data of the seat pressure distribution based on the shape center position calculated from a distribution shape of the seat pressure distribution, the accuracy of assessing the disease condition can be further improved thanks to the data based on the shape center position.

In case of assessing the disease condition of the subject by a machine learning for the data of the seat pressure distribution classified depending on a degree of a road curvature of a road on which the vehicle travels, the accuracy of assessing the disease condition can be further improved by classifying the data depending on a degree of a road curvature of a road on which the vehicle travels, and applying the measured classified data to a learned model built by machine learning.

The mobile terminal device 20 or the in-vehicle terminal device 30 may be equipped with the above classifiers.

In addition, the present invention is not limited to the above embodiments. The above embodiments are merely examples. Any other embodiment that has essentially the same configuration and produces a similar effect as the technical ideas described in the claims of the present invention falls within the scope of the invention.

REFERENCE SIGNS LIST

10: INFORMATION PROCESSING SERVER DEVICE (DISEASE-CONDITION ASSESSMENT DEVICE)
12: STORAGE UNIT (STORAGE MEANS)
12f: DISEASE ASSESSMENT DATABASE (STORAGE MEANS)
20: MOBILE TERMINAL DEVICE (DISEASE-CONDITION ASSESSMENT DEVICE, TERMINAL DEVICE)
30: IN-VEHICLE TERMINAL DEVICE (DISEASE-CONDITION ASSESSMENT DEVICE, TERMINAL DEVICE)
S: DISEASE-CONDITION ASSESSMENT SYSTEM
T: SUBJECT
V: VEHICLE

The invention claimed is:

1. A disease-condition assessment device comprising:
    a seat pressure distribution acquiring unit for acquiring a data of a seat pressure distribution on a seating surface where a subject operating a vehicle is seated;
    a center position calculating unit for calculating a center position depending on the seat pressure distribution, the center position being a position selected from the group consisting of a shape center position calculated from a shape of the seat pressure distribution, a center of gravity position calculated by a weighted average of the position of each point in a heat map of seat pressure, and both the shape center position and the center of gravity position;
    a degree-of-laterality calculating unit for calculating a degree of laterality in the seat pressure distribution based on the center position;
    a disease-condition assessment unit for assessing a disease condition of the subject depending on the degree of laterality; and
    a communication unit configured to transmit a control signal to an in-vehicle terminal device that can control a drive mechanism of the vehicle to stop the vehicle, stop the vehicle at a predetermined place, or navigate the vehicle to a hospital in view of the disease condition,
    wherein the degree of laterality includes multiple of:
        a value of a position of the shape center position in a lateral axis direction relative to an origin position on the seating surface,
        a value of a position of a center of gravity position in the lateral axis direction relative to the origin on the seating surface, and
        a difference between the shape center position and the center of gravity position in the lateral axis direction.

2. The disease-condition assessment device according to claim 1, wherein
    the disease-condition assessment unit assesses the disease condition of the subject depending on the degree of laterality with reference to a storage unit storing information on the relationship between the disease condition of a predetermined disease and the data of the seat pressure distribution measured in advance.

3. The disease-condition assessment device according to claim 1, wherein
    the center position is the shape center position.

4. The disease-condition assessment device according to claim 3, wherein
    the shape center position is a concave portion of the distribution shape.

5. The disease-condition assessment device according to claim 3, wherein
the shape center position is a point where the distance from a frontal line in the subject to the outer edge of the distribution shape becomes maximal.

6. The disease-condition assessment device according to claim 1, wherein
the center position is the center of gravity.

7. The disease-condition assessment device according to claim 1, wherein
the center position includes the shape center position calculated from a distribution shape of the seat pressure distribution and the center of gravity position of the seat pressure distribution, and
the disease-condition assessment unit assesses the disease condition of the subject depending on the degree of laterality calculated from the shape center position and the degree of laterality calculated from the seat-pressure center position.

8. The disease-condition assessment device according to claim 1, wherein
the degree of laterality includes the difference between the shape center position and the center of gravity position in the lateral axis direction.

9. The disease-condition assessment device according to claim 1, wherein
the disease-condition assessment unit assesses the disease condition of the subject from a statistical value of the degree of laterality.

10. The disease-condition assessment device according to claim 1, wherein
the disease-condition assessment unit assesses a post-stroke paralysis depending on the degree of laterality.

11. The disease-condition assessment device according to claim 10, wherein
the disease-condition assessment unit assesses the degree of the post-stroke paralysis depending on the degree of laterality.

12. The disease-condition assessment device according to claim 1, wherein
the disease-condition assessment unit assesses a post-stroke hemiplegia depending on the degree of laterality.

13. The disease-condition assessment device according to claim 1, wherein
the disease-condition assessment unit assesses the disease condition of the subject depending on the degree of laterality and on a degree of a road curvature of a road on which the vehicle travels.

14. The disease-condition assessment device according to claim 1, further comprising
a physiological data acquiring unit for acquiring a physiological data of the subject operating the vehicle;
wherein the disease-condition assessment unit assesses the disease condition of the subject based on the degree of laterality and the physiological data.

15. The disease-condition assessment device according to claim 14, further comprising
a frequency analysis unit for frequency-analyzing the physiological data;
wherein the disease-condition assessment unit assesses the disease condition of the subject based on the degree of laterality and a result of frequency-analyzing the physiological data.

16. The disease-condition assessment device according to claim 14, wherein
the physiological data acquiring unit comprises a sensor configured to attach to an arm of the subject and the physiological data is a rotational data of the subject's arm rotation when operating the vehicle.

17. The disease-condition assessment device according to claim 16, wherein
the disease-condition assessment unit assesses a hemiplegia in the opposite side to the subject's arm on which the sensor is attached.

18. The disease-condition assessment device according to claim 1, further comprising
an operation-quantity data acquiring unit for acquiring an operation-quantity data of a subject operating a vehicle;
wherein the disease-condition assessment unit assesses the disease condition of the subject based on the degree of laterality and the operation-quantity data.

19. The disease-condition assessment device according to claim 1, wherein
the disease-condition assessment unit assesses the disease-condition of the subject by a machine learning for the data of the seat pressure distribution.

20. The disease-condition assessment device according to claim 19, wherein
the disease-condition assessment unit assesses the disease condition of the subject by a machine learning for the data of the seat pressure distribution based on the shape center position.

21. The disease-condition assessment device according to claim 19, wherein
the disease-condition assessment unit assesses the disease condition of the subject by a machine learning for the data of the seat pressure distribution, and the disease-condition assessment unit classifies the data of the seat pressure distribution to assess the disease condition depending on a degree of a road curvature of a road on which the vehicle travels.

22. A disease-condition assessment method comprising:
a seat pressure distribution acquiring step of acquiring a data of a seat pressure distribution on a seating surface where a subject operating a vehicle is seated;
a center position calculating step of calculating a center position depending on the seat pressure distribution, the center position being a position selected from the group consisting of a shape center position calculated from a shape of the seat pressure distribution, a center of gravity position calculated by a weighted average of the position of each point in a heat map of seat pressure, and both the shape center position and the center of gravity position;
a degree-of-laterality calculating step of calculating a degree of laterality in the seat pressure distribution based on the center position;
a disease-condition assessment step of assessing a disease condition of the subject depending on the degree of laterality; and
a transmitting step of transmitting a control signal to an in-vehicle terminal device that can control a drive mechanism of the vehicle to stop the vehicle, stop the vehicle at a predetermined place, or navigate the vehicle to a hospital in view of the disease condition,
wherein the degree of laterality includes multiple of:
a value of a position of the shape center position in a lateral axis direction relative to an origin position on the seating surface,
a value of a position of a center of gravity position in the lateral axis direction relative to the origin on the seating surface, and
a difference between the shape center position and the center of gravity position in the lateral axis direction.

23. A non-transitory computer-readable storage medium recording a program for assessing a disease condition of a subject, the program causing a computer to function as:
- a seat pressure distribution acquiring unit for acquiring a data of a seat pressure distribution on a seating surface where the subject operating a vehicle is seated;
- a center position calculating unit for calculating a center position depending on the seat pressure distribution, the center position being a position selected from the group consisting of a shape center position calculated from a shape of the seat pressure distribution, a center of gravity position calculated by a weighted average of the position of each point in a heat map of seat pressure, and both the shape center position and the center of gravity position;
- a degree-of-laterality calculating unit for calculating a degree of laterality in the seat pressure distribution based on the center position;
- a disease-condition assessment unit for assessing the disease condition of the subject depending on the degree of laterality; and
- a communication unit configured to transmit a control signal to an in-vehicle terminal device that can control a drive mechanism of the vehicle to stop the vehicle, stop the vehicle at a predetermined place, or navigate the vehicle to a hospital in view of the disease condition, wherein the degree of laterality includes multiple of:
- a value of a position of the shape center position in a lateral axis direction relative to an origin position on the seating surface,
- a value of a position of a center of gravity position in the lateral axis direction relative to the origin on the seating surface, and
- a difference between the shape center position and the center of gravity position in the lateral axis direction.

24. A disease-condition assessment system comprising:
- a terminal device that collects a data of a seat pressure distribution on a seating surface where a subject operating a vehicle is seated; and
- a disease-condition assessment device for assessing a disease condition of the subject based on the data of the seat pressure distribution, the disease-condition assessment device including
- seat pressure distribution acquiring unit for acquiring the data of the seat pressure distribution from the terminal device;
- center position calculating unit for calculating a center position depending on the seat pressure distribution, the center position being a position selected from the group consisting of a shape center position calculated from a shape of the seat pressure distribution, a center of gravity position calculated by a weighted average of the position of each point in a heat map of seat pressure, and both the shape center position and the center of gravity position;
- degree-of-laterality calculating unit for calculating a degree of laterality in the seat pressure distribution based on the center position;
- disease-condition assessment unit for assessing a disease condition of the subject depending on the degree of laterality; and
- a communication unit configured to transmit a control signal to an in-vehicle terminal device that can control a drive mechanism of the vehicle to stop the vehicle, stop the vehicle at a predetermined place, or navigate the vehicle to a hospital in view of the disease condition, wherein the degree of laterality includes multiple of:
- a value of a position of the shape center position in a lateral axis direction relative to an origin position on the seating surface,
- a value of a position of a center of gravity position in the lateral axis direction relative to the origin on the seating surface, and
- a difference between the shape center position and the center of gravity position in the lateral axis direction.

* * * * *